United States Patent
Park et al.

(10) Patent No.: US 11,251,849 B2
(45) Date of Patent: Feb. 15, 2022

(54) ITERATIVE MULTI-BEAM SELECTION WITH UPLINK-DOWNLINK BEAM TRAINING

(71) Applicant: QUALCOMM Incorporated, San Diego, CA (US)

(72) Inventors: Sungwoo Park, San Diego, CA (US); Kiran Venugopal, Raritan, NJ (US); Tianyang Bai, Somerville, NJ (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/991,782

(22) Filed: Aug. 12, 2020

(65) Prior Publication Data
US 2021/0050892 A1 Feb. 18, 2021

Related U.S. Application Data

(60) Provisional application No. 62/888,331, filed on Aug. 16, 2019.

(51) Int. Cl.
*H04B 7/06* (2006.01)
*H04L 5/00* (2006.01)

(52) U.S. Cl.
CPC ......... *H04B 7/0617* (2013.01); *H04B 7/0626* (2013.01); *H04B 7/0695* (2013.01); *H04L 5/005* (2013.01)

(58) Field of Classification Search
CPC .. H04B 7/0617; H04B 7/0626; H04B 7/0695; H04L 5/005
See application file for complete search history.

(56) References Cited

U.S. PATENT DOCUMENTS

| 9,853,702 B1 * | 12/2017 | Liang ................... H04B 7/0456 |
| 2014/0341310 A1 | 11/2014 | Rahman et al. |

(Continued)

OTHER PUBLICATIONS

International Search Report and Written Opinion—PCT/US2020/046210—ISA/EPO—dated Nov. 5, 2020.

(Continued)

*Primary Examiner* — Jaison Joseph
(74) *Attorney, Agent, or Firm* — Holland & Hart LLP

(57) ABSTRACT

Methods, systems, and devices for wireless communications are described. A first device may transmit, to a second device, reference signals using combinations of analog beamforming parameters over multiple cycles. The reference signals may be transmitted for different combinations of transmit beamforming parameters and receive beamforming parameters over different cycles of the multiple cycles. The first device may receive, from the second device over the multiple cycles, a set of reports. Each report may indicate combinations of analog beamforming parameters selected for the analog beamforming parameters at the second device. Each combination of analog beamforming parameters may correspond to different cycles of the multiple cycles. The first device may set, for each radio frequency (RF) chain of a plurality of RF chains associated with the first device, a corresponding combination of analog beamforming parameters, and communicate with the second device via two or more beams based on the setting.

30 Claims, 18 Drawing Sheets

(56) References Cited

U.S. PATENT DOCUMENTS

| | | | |
|---|---|---|---|
| 2018/0034606 A1* | 2/2018 | Ahn | H04L 5/0055 |
| 2018/0048358 A1* | 2/2018 | Li | H04B 7/0617 |
| 2018/0206132 A1* | 7/2018 | Guo | H04B 7/02 |
| 2019/0109629 A1* | 4/2019 | Park | H04B 7/0456 |
| 2019/0109689 A1* | 4/2019 | Huang | H04L 5/14 |
| 2019/0253181 A1 | 8/2019 | Rahman et al. | |

OTHER PUBLICATIONS

Kim C., et al., "Multi-Beam Transmission Diversity with Hybrid Beamforming for MIMO-OFDM Systems", 2013 IEEE Globecom Workshops (GC Wkshps), IEEE, Dec. 9, 2013 (Dec. 9, 2013), pp. 61-65, XP032599946, DOI: 10.11 09/GLOCOMW.2013.6824962, [retrieved on Jun. 3, 2014].

* cited by examiner

ITERATIVE MULTI-BEAM SELECTION WITH UPLINK-DOWNLINK BEAM TRAINING

CROSS REFERENCE

The present application for patent claims the benefit of U.S. Provisional Patent Application No. 62/888,331 by PARK et al., entitled "ITERATIVE MULTI-BEAM SELECTION WITH UPLINK-DOWNLINK BEAM TRAINING," filed Aug. 16, 2019, assigned to the assignee hereof, and expressly incorporated by reference herein.

FIELD OF TECHNOLOGY

The following relates generally to wireless communications and more specifically to iterative multi-beam selection with uplink-downlink beam training.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, each of which may be otherwise known as a user equipment (UE). Some wireless communications systems may support beamforming operations for directional communications. Beamforming, which may also be referred to as spatial filtering, directional transmission, or directional reception, may be a signal processing technique that may be used at a transmitting device or a receiving device to select, shape, or steer an antenna beam (for example, a transmit directional beam, a receive directional beam) along a spatial path between the transmitting device and the receiving device. Some wireless communications systems may support beamforming operations to mitigate pathloss and blockages with respect to the spatial path. As demand for communication efficiency increases, it may be desirable for a wireless communications system to target low latencies and improve reliability for beamforming operations.

SUMMARY

The described techniques may relate to configuring a communication device, which may be a user equipment (UE), to support millimeter wave (mmW) communications (also referred to as directional communications). In some examples, the described techniques may be used to configure the communication device with a codebook to improve beamforming reliability and data rate for mmW communications in multiple-input multiple output (MIMO) wireless communications systems. The codebook may include a combination of beamforming parameters (also referred to as analog beamforming parameters). The described techniques may also be used to configure the communication device to perform a beamforming operation, such as a beam selection operation, a beam training operation, or the like. In some examples, the described techniques may be used to configure the communication device to perform an iterative search for determination and selection of a combination of beamforming parameters.

A method of wireless communication is described. The method may include transmitting, from a first device to a second device, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles, receiving, from the second device over the set of cycles, a set of reports, each report of the set of reports indicating a set of combinations of analog beamforming parameters selected for the analog beamforming parameters at the second device, where each combination of analog beamforming parameters of the set of combinations of analog beamforming parameters corresponds to different cycles of the set of cycles, setting, for each radio frequency chain of a set of radio frequency chains associated with the first device, a corresponding combination of analog beamforming parameters of the set of combinations of analog beamforming parameters based on the receiving, and communicating with the second device via two or more beams based on the setting.

An apparatus for wireless communication is described. The apparatus may include a processor, memory coupled with the processor, and instructions stored in the memory. The instructions may be executable by the processor to cause the apparatus to transmit, from the apparatus to a second apparatus, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles, receive, from the second apparatus over the set of cycles, a set of reports, each report of the set of reports indicating a set of combinations of analog beamforming parameters selected for the analog beamforming parameters at the second apparatus, where each combination of analog beamforming parameters of the set of combinations of analog beamforming parameters corresponds to different cycles of the set of cycles, set, for each radio frequency chain of a set of radio frequency chains associated with the apparatus, a corresponding combination of analog beamforming parameters of the set of combinations of analog beamforming parameters based on the receiving, and communicate with the second device via two or more beams based on the setting.

Another apparatus for wireless communication is described. The apparatus may include means for transmitting, from the apparatus to a second apparatus, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles, receiving, from the second apparatus over the set of cycles, a set of reports, each report of the set of reports indicating a set of combinations of analog beamforming parameters selected for the analog beamforming parameters at the second apparatus, where each combination of analog beamforming parameters of the set of combinations of analog beamforming parameters corresponds to different cycles of the set of cycles, setting, for each radio frequency chain of a set of radio frequency chains associated with the apparatus, a corresponding combination of analog beamforming parameters of the set of combinations of analog beamforming parameters based on the receiving, and communicating with the second apparatus via two or more beams based on the setting.

A non-transitory computer-readable medium storing code for wireless communication is described. The code may include instructions executable by a processor to transmit, from a first device to a second device, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles, receive, from the second device over the set of cycles, a set of reports, each report of the set of reports indicating a set of combinations of analog beamforming parameters selected for the analog beamforming parameters at the second device, where each combination of analog beamforming parameters of the set of combinations of analog beamforming parameters corresponds to different cycles of the set of cycles, set, for each radio frequency chain of a set of radio frequency chains associated with the first device, a corresponding combination of analog beamforming parameters of the set of combinations of analog beamforming parameters based on the receiving, and communicate with the second device via two or more beams based on the setting.

In some examples of the method, apparatuses, and non-transitory computer-readable medium described herein, each report of the set of reports indicates a combination of analog beamforming parameters that provides a codebook index value for a codebook of beamforming parameters.

In some examples of the method, apparatuses, and non-transitory computer-readable medium described herein, the codebook of beamforming parameters maps codebook index values to the different combinations of the one or more sets of transmit beamforming parameters and the one or more sets of receive beamforming parameters.

In some examples of the method, apparatuses, and non-transitory computer-readable medium described herein, the set of cycles may be based on a number of radio frequency chains associated with the first device.

In some examples of the method, apparatuses, and non-transitory computer-readable medium described herein, the set of combinations of analog beamforming parameters may be associated with reference signal transmissions that may have a highest mutual information (MI) value of the set of reference signals.

In some examples of the method, apparatuses, and non-transitory computer-readable medium described herein, the first device may be a base station and the second device may be a UE.

In some examples of the method, apparatuses, and non-transitory computer-readable medium described herein, the set of reference signals may be downlink reference signals transmitted to the UE in a beam sweeping procedure.

In some examples of the method, apparatuses, and non-transitory computer-readable medium described herein, the downlink reference signals include one or more of a channel state information reference signal (CSI-RS) or a synchronization signal block (SSB).

In some examples of the method, apparatuses, and non-transitory computer-readable medium described herein, the first device may be a UE and the second device may be a base station.

In some examples of the method, apparatuses, and non-transitory computer-readable medium described herein, the set of reference signals may be uplink reference signals transmitted to the base station in a beam sweeping procedure.

In some examples of the method, apparatuses, and non-transitory computer-readable medium described herein, the uplink reference signals include SRSs.

In some examples of the method, apparatuses, and non-transitory computer-readable medium described herein, the set of reference signals includes reference signals that may be specific to transmissions from the first device to the second device, and where the first device determines set of combinations of analog beamforming parameters for use at the first device based on one or more different reference signals that may be specific to transmissions from the second device to the first device.

In some examples of the method, apparatuses, and non-transitory computer-readable medium described herein, the set of cycles may be based on a number of radio frequency chains associated with the second device.

A method of wireless communication is described. The method may include measuring, at a second device, a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles, selecting a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device, and communicating with the first device via two or more beams based on the set of combinations of analog beamforming parameters.

An apparatus for wireless communication is described. The apparatus may include a processor, memory coupled with the processor, and instructions stored in the memory. The instructions may be executable by the processor to cause the apparatus to measure, the apparatus, a channel quality of a set of reference signals that are transmitted by a second apparatus using a set of combinations of analog beamforming parameters over a set of cycles, where the set of reference signals is transmitted for different combinations of one or more sets of transmit beamforming parameters and one or more sets of receive beamforming parameters over different cycles of the set of cycles, select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the apparatus, and communicate with the second apparatus via two or more beams based on the set of combinations of analog beamforming parameters.

Another apparatus for wireless communication is described. The apparatus may include means for measuring, at the apparatus, a channel quality of a set of reference signals that are transmitted by a second apparatus using a set of combinations of analog beamforming parameters over a set of cycles, where the set of reference signals is transmitted for different combinations of one or more sets of transmit beamforming parameters and one or more sets of receive beamforming parameters over different cycles of the set of cycles, selecting a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the apparatus, and communicating with the second apparatus via two or more beams based on the set of combinations of analog beamforming parameters.

A non-transitory computer-readable medium storing code for wireless communication is described. The code may include instructions executable by a processor to measure, at a second device, a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles, select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device, and communicate with the first device via two or more beams based on the set of combinations of analog beamforming parameters.

Some examples of the method, apparatuses, and non-transitory computer-readable medium described herein may further include operations, features, means, or instructions for transmitting, to the first device over the set of cycles, a set of reports, each report of the set of reports indicating the set of combinations of analog beamforming parameters selected for the analog beamforming parameters at the second device.

In some examples of the method, apparatuses, and non-transitory computer-readable medium described herein, each report of the set of reports indicates a combination of analog beamforming parameters that provides a codebook index value for a codebook of beamforming parameters.

In some examples of the method, apparatuses, and non-transitory computer-readable medium described herein, the codebook of beamforming parameters maps codebook index values to the different combinations of the one or more sets of transmit beamforming parameters and the one or more sets of receive beamforming parameters.

Some examples of the method, apparatuses, and non-transitory computer-readable medium described herein may further include operations, features, means, or instructions for setting, for each radio frequency chain of the set of radio frequency chains associated with the second device, a corresponding combination of analog beamforming parameters of the set of combinations of analog beamforming parameters based on the receiving.

Some examples of the method, apparatuses, and non-transitory computer-readable medium described herein may further include operations, features, means, or instructions for estimating an effective channel between the second device and the first device for each of the different combinations of the one or more sets of transmit beamforming parameters and the one or more sets of receive beamforming parameters, and where the set of combinations of analog beamforming parameters may be selected based on a magnitude of the effective channel estimates.

In some examples of the method, apparatuses, and non-transitory computer-readable medium described herein, the set of combinations of analog beamforming parameters may be associated with reference signal transmissions that may have a highest mutual information (MI) value of the set of reference signals.

In some examples of the method, apparatuses, and non-transitory computer-readable medium described herein, the first device may be a base station and the second device may be a UE.

In some examples of the method, apparatuses, and non-transitory computer-readable medium described herein, the set of reference signals may be downlink reference signals transmitted to the UE in a beam sweeping procedure.

In some examples of the method, apparatuses, and non-transitory computer-readable medium described herein, the downlink reference signals include one or more of a CSI or an SSB.

In some examples of the method, apparatuses, and non-transitory computer-readable medium described herein, the first device may be a UE and the second device may be a base station.

In some examples of the method, apparatuses, and non-transitory computer-readable medium described herein, the set of reference signals may be uplink reference signals transmitted to the base station in a beam sweeping procedure.

In some examples of the method, apparatuses, and non-transitory computer-readable medium described herein, the uplink reference signals include sounding reference signals (SRSs).

In some examples of the method, apparatuses, and non-transitory computer-readable medium described herein, the set of reference signals includes reference signals that may be specific to transmissions from the first device to the second device, and where the second device determines the set of combinations of analog beamforming parameters for use at the second device based on one or more different reference signals that may be specific to transmissions from the first device to the second device.

DETAILED DESCRIPTION

Figure 1:
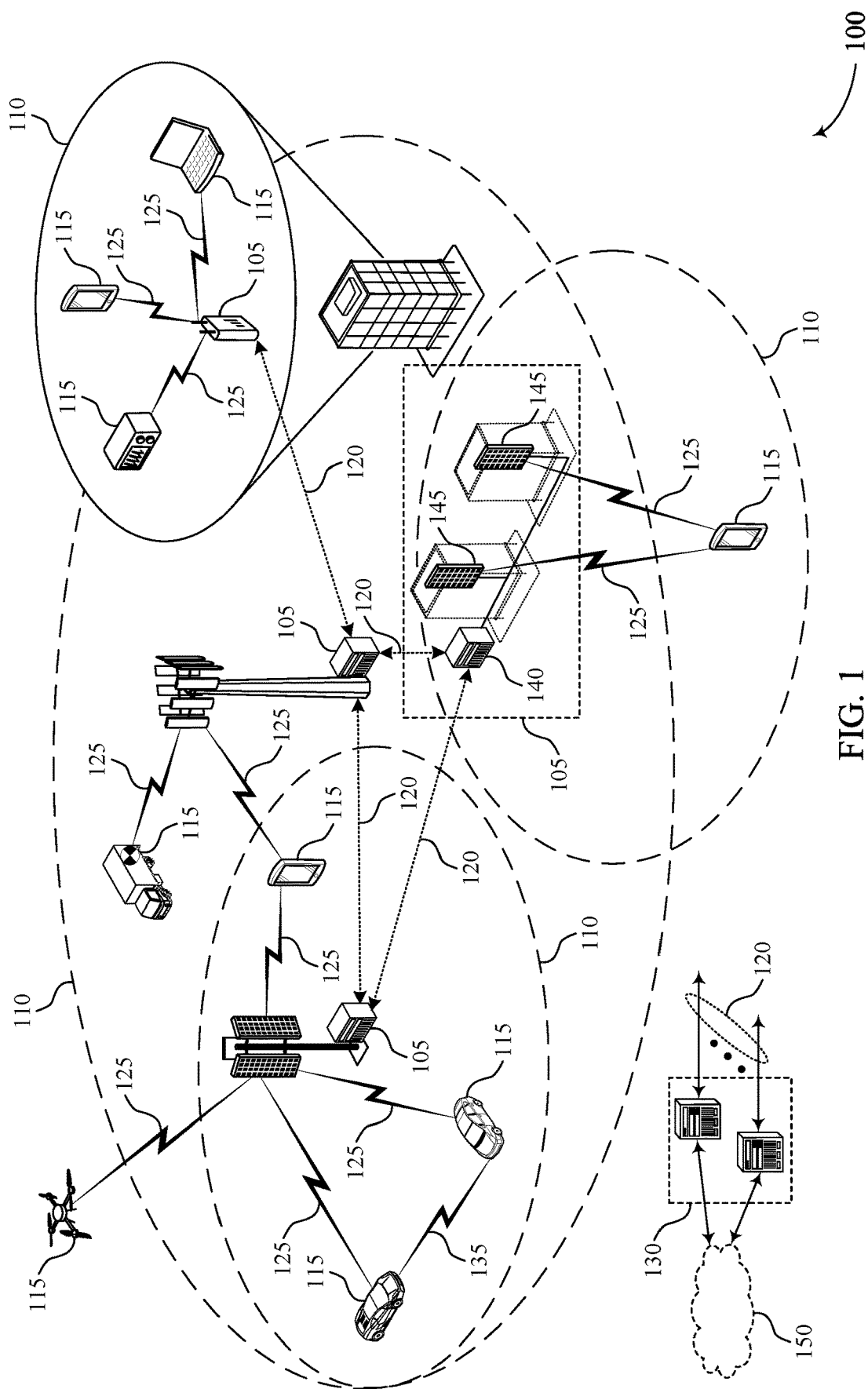
FIGS. 1 through 5 illustrate examples of wireless communications systems that support iterative multi-beam selection with uplink-downlink beam training in accordance with aspects of the present disclosure.

Some wireless communication systems may include communication devices, such as user equipments (UEs) and base stations, for example, next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. Some wireless communications systems, such as multiple-input multiple output (MIMO) systems, may configure the communication devices to support millimeter wave (mmW) communications (also referred to as directional communications). In some examples, the communication devices may experience one or more of a pathloss or a blockage with respect to a spatial path for the mmW communications. As a result, the communication devices may support beamforming operations to counter one or more of the pathloss or the blockage, among other examples.

The communication devices may, for example, perform a beamforming operation in accordance with one or more codebooks to improve beamforming reliability and data rate for mmW communications. The codebooks may have a number N possible beamforming vectors, where N may refer to a number of antennas of the communication devices. In some examples, N may be dependent on $N_T$ and $N_R$, where $N_T$ refers to a number of transmit antennas and $N_R$ refers to a number of receive antennas. In some examples, the beamforming operation may involve the communication devices identifying, in accordance with the codebooks, an $f_n$ and a $w_m$, that results in a metric satisfying a threshold, where $f_n$ is a beamforming vector and $w_m$ is also a beamforming combining vector.

The metric may, in some examples, include a signal strength, and the signal strength may be dependent on $w^*_m H f_n$, where H is a channel associated with the mmW communications and $w_m$, and $f_n$ are the best beamforming vectors for H. Therefore, $w^*_m H f_n$ may be defined as an effective channel. The communication devices may thus identify and select a directional beam pair (e.g., $(f_n, w_m)$) for mmW communications (i.e., a single beam approach). In some examples, to enable multi-stream operation (e.g., in MIMO systems), the communications devices may determine and select multiple transmit directional beams and receive directional beams. The multiple transmit directional beams and receive directional beams may be used simultaneously at the communication devices (e.g., at a transmitting device, at a receiving device). Additionally, in some examples, the various directional beams may be from a same or different panel of the communication devices. For example, the communication devices may include multiple panels, each panel may include an array of same or different antennas (e.g., one or more of $N_T$ or $N_R$).

In some examples, the communication devices may perform a search over possible beamforming pairs $(f_n, w_m)$. As demand for communication efficiency increases, it may be desirable for the communications devices to target low latencies and improve reliability for beamforming operations, and more specifically to iteratively determine and select a beamforming pair $(f_n, w_m)$ (e.g., beam weights) to improve data rates in MIMO systems. In some examples, the communication devices may be configured with one or more signaling mechanisms to iteratively select beam weight for maximizing MIMO rate, in accordance with one or more analog codebook constraints at the communication devices.

In some examples, the communication devices may support a codebook to improve beamforming reliability and data rate for mmW communications in MIMO wireless communications systems. The codebook may include a combination of beamforming parameters. The communication devices may perform a beamforming operation, such as a beam selection operation, a beam training operation, or the like. In some examples, the communication devices may perform an iterative search for determination and selection of a combination of beamforming parameters in the codebook. For example, a first communication device may transmit to a second communication device, a plurality of reference signals using a plurality of combinations of analog beamforming parameters over a plurality of cycles. The plurality of reference signals may be transmitted for different combinations of one or more sets of transmit beamforming parameters and one or more sets of receive beamforming parameters over different cycles of the plurality of cycles. The first communication device may receive, from the second communication device over the plurality of cycles, a plurality of reports, each report of the plurality of reports indicating a plurality of combinations of analog beamforming parameters selected for the analog beamforming parameters at the second device. Each combination of analog beamforming parameters of the plurality of combinations of analog beamforming parameters may correspond to different cycles of the plurality of cycles. The first communication device may set, for each radio frequency chain of a plurality of radio frequency chains associated with the first communication device, a corresponding combination of analog beamforming parameters of the plurality of combinations of analog beamforming parameters based at least in part on the receiving, and communicate with the second communication device via two or more beams based on the settings.

Particular aspects of the subject matter described in this disclosure may be implemented to realize one or more of the following potential advantages. The techniques employed by the described communication devices may provide benefits and enhancements to the operation of the communication devices. For example, operations performed by the described communication devices may provide improvements to power consumption when performing beam operations. In some examples, configuring the described communication devices to perform iterative multi-beam selection with uplink-downlink beam training may support improvements to spectral efficiency, higher data rates and, in some examples, may promote high reliability and low latency for beamforming operations, among other benefits.

Aspects of the disclosure are initially described in the context of wireless communications systems. Aspects of the disclosure are further illustrated by and described with reference to process flows that relate to iterative multi-beam selection with uplink-downlink beam training. Aspects of the disclosure are further illustrated by and described with reference to apparatus diagrams, system diagrams, and flowcharts that relate to iterative multi-beam selection with uplink-downlink beam training.

FIG. 1 illustrates an example of a wireless communications system 100 that supports iterative multi-beam selection with uplink-downlink beam training in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1. UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, one or more of the base stations 105 or the UEs 115 may support a codebook to improve beamforming reliability and data rate for mmW communications in MIMO wireless communications systems. The codebook may include a combination of beamforming parameters. One or more of the base stations 105 or the UEs 115 may perform a beamforming operation, such as a beam selection operation, a beam training operation, or the like. In some examples, one or more of the base stations 105 or the UEs 115 may perform an iterative search for determination and selection of a combination of beamforming parameters in the codebook. For example, one or more of the base stations 105 or the UEs 115 may transmit to one or more of the base stations 105 or the UEs 115, a plurality of reference signals using a plurality of combinations of analog beamforming parameters over a plurality of cycles (also referred to as iterations). For example, a cycle thus may relate to an iterative search performed by the base stations 105 or the UEs 115 in determining beamforming parameters. As such, a cycle is an iteration of the iterative search. The plurality of reference signals may be transmitted for different combinations of one or more sets of transmit beamforming parameters and one or more sets of receive beamforming parameters over different cycles of the plurality of cycles.

One or more of the base stations 105 or the UEs 115 may receive, from the one or more of the base stations 105 or the UEs 115 over the plurality of cycles, a plurality of reports, each report of the plurality of reports indicating a plurality of combinations of analog beamforming parameters selected for the analog beamforming parameters at the second device. Each combination of analog beamforming parameters of the plurality of combinations of analog beamforming parameters may correspond to different cycles of the plurality of cycles. One or more of the base stations 105 or the UEs 115 may set, for each radio frequency chain of a plurality of radio frequency chains associated with one or more of the base stations 105 or the UEs 115, a corresponding combination of analog beamforming parameters of the plurality of combinations of analog beamforming parameters based at least in part on the receiving, and communicate with the second communication device via two or more beams based on the settings.

In some examples, one or more of the base stations 105 or the UEs 115 may measure a channel quality of a plurality of reference signals that are transmitted by one or more of the base stations 105 or the UEs 115 using a plurality of combinations of analog beamforming parameters over a plurality of cycles. The plurality of reference signals may be transmitted for different combinations of one or more sets of transmit beamforming parameters and one or more sets of receive beamforming parameters over different cycles of the plurality of cycles. One or more of the base stations 105 or the UEs 115 may select a plurality of combinations of analog beamforming parameters based on the measured channel quality of the plurality of reference signals over the plurality of cycles. Each combination of analog beamforming parameters of the plurality of combinations of analog beamforming parameters correspond to different cycles of the plurality of cycles and a different radio frequency chain of a plurality of radio frequency chains associated with one or more of the base stations 105 or the UEs 115.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more subbands. The base station 105 may transmit a reference signal (e.g., a cell-specific reference signal (CRS), a channel state information reference signal (CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
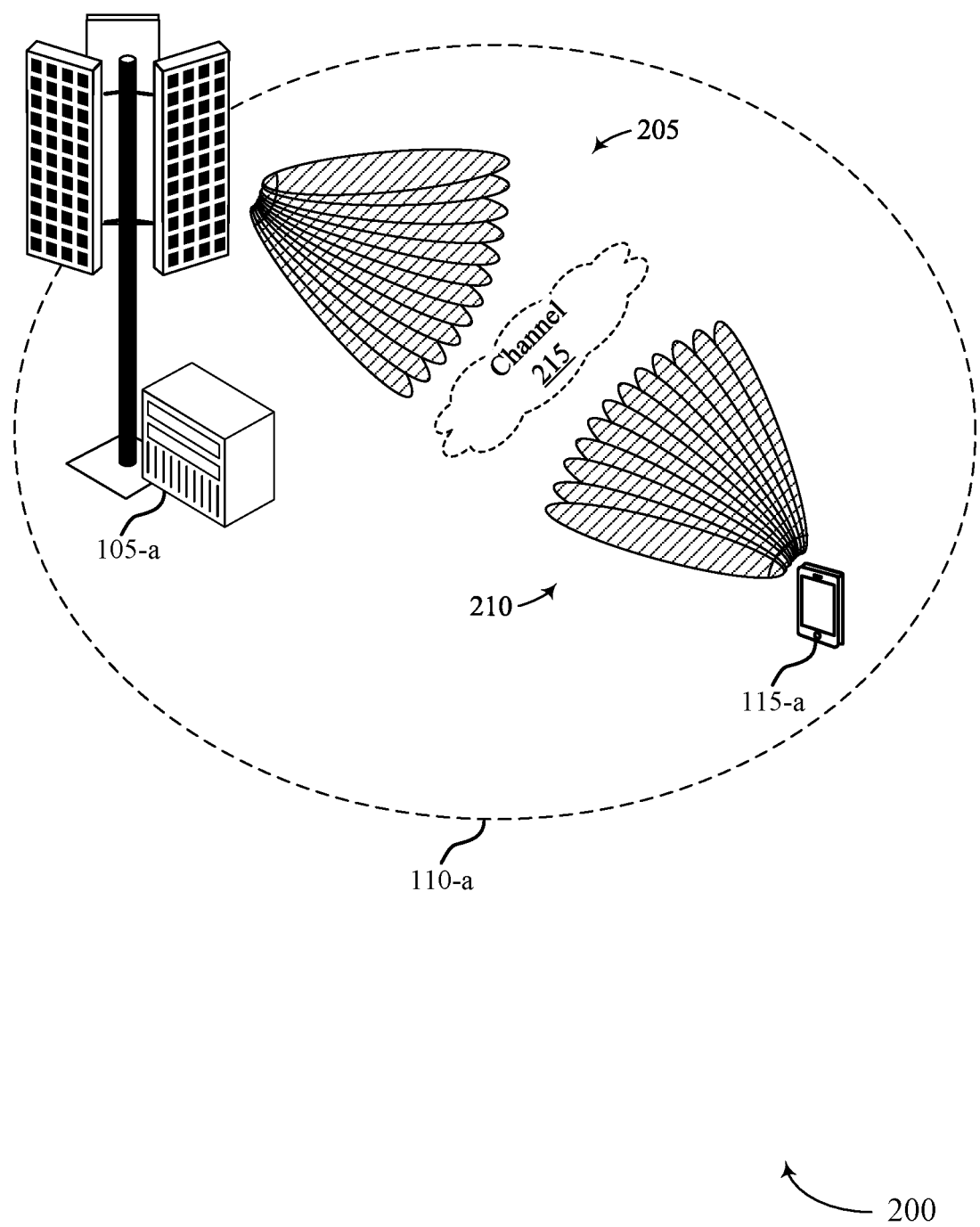

FIG. 2 illustrates an example of a wireless communications system 200 that supports iterative multi-beam selection with uplink-downlink beam training in accordance with aspects of the present disclosure. The wireless communications system 200 may include a base station 105-a and a UE 115-a within a geographic coverage area 110-a. The base station 105-a and the UE 115-a may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. In some examples, the wireless communications system 200 may implement aspects of the wireless communications system 100.

The wireless communications system 200 may, for example, be a multiple-input multiple output (MIMO) system. The base station 105-a and the UE 115-a may thus support directional communications. In some examples, directional communications may include one or more of the base station 105-a transmitting (or receiving on) one or more directional beams 205 or the UE 115-a transmitting (or receiving) one or more directional beams 210. In some examples, one or more directional beams 205 may have a beam correspondence with one or more directional beams 210. For example, a directional beam 205 and a directional beam 210 may be a beam pair. The wireless communications system 200 may therefore support improvements to power consumption, spectral efficiency, higher data rates and, in some examples, may promote high reliability and low latency for beamforming operations, among other benefits.

In the example of FIG. 2, the base station 105-a and the UE 115-a may perform a beamforming operation in accordance with one or more codebooks to improve beamforming reliability and data rate for directional communications. The codebooks may have a number N possible beamforming vectors, where N may refer to a number of antennas of the base station 105-a and the UE 115-a. In some examples, N may be dependent on $N_T$ and $N_R$, where $N_T$ refers to a number of transmit antennas (e.g., of the base station 105-a) and $N_R$ refers to a number of receive antennas (e.g., of the UE 115-a). In some examples, the beamforming operation may involve the base station 105-a identifying, in accordance with the codebooks, an $f_n$ that results in a metric satisfying a threshold, where $f_n$ is a beamforming vector. Similarly, the beamforming operation may involve the UE 115-a identifying, in accordance with the codebooks, a $w_m$ that results in a metric satisfying a threshold, where $w_m$ is a beamforming combining vector.

The metric may, in some examples, include a signal strength, and the signal strength may be dependent on $w^*_m H f_n$, where H is a channel 215 associated with the directional communications between the base station 105-a and the UE 115-a, and $w_m$, and $f_n$ are the best beamforming vectors for H. Therefore, $w^*_m H f_n$ may be defined as an effective channel. The base station 105-a and the UE 115-a may thus identify and select a directional beam pair (e.g., ($f_n$, $w_m$)) for directional communications (i.e., a single beam approach). In some examples, to enable multi-stream operation, one or more of the base station 105-a or the UE 115-a may determine and select multiple transmit directional beams and receive directional beams. For example, the base station 105-a may determine and select multiple directional beams 205, which may correspond to one or more of transmit directional beams or receive directional beams. In some other examples, the UE 115-a may determine and select multiple directional beams 210, which may correspond to one or more of transmit directional beams or receive directional beams. The multiple transmit directional beams and receive directional beams may be used simultaneously at one or more of the base station 105-a or the UE 115-a. Additionally, in some examples, the various directional beams may be from a same or different panel of one or more of the base station 105-a or the UE 115-a. For example, one or more of the base station 105-a or the UE 115-a may be configured with multiple panels, and each panel may include an array of same or different antennas (e.g., one or more of $N_T$ or $N_R$).

In some examples, one or more of the base station 105-a or the UE 115-a may perform a search over a number of possible beamforming pairs ($f_n$, $w_m$). As demand for communication efficiency increases, it may be desirable for one or more of the base station 105-a or the UE 115-a to target low latencies and improve reliability for beamforming operations, and more specifically to iteratively determine and select a beamforming pair ($f_n$, $w_m$). In some examples, one or more of the base station 105-a or the UE 115-a may be configured to select one or more beam weights, in accordance with an iterative approach, for improving MIMO rate in the wireless communications system 200, and in accordance with one or more analog codebook constraints at one or more of the base station 105-a or the UE 115-a.

Figure 3:
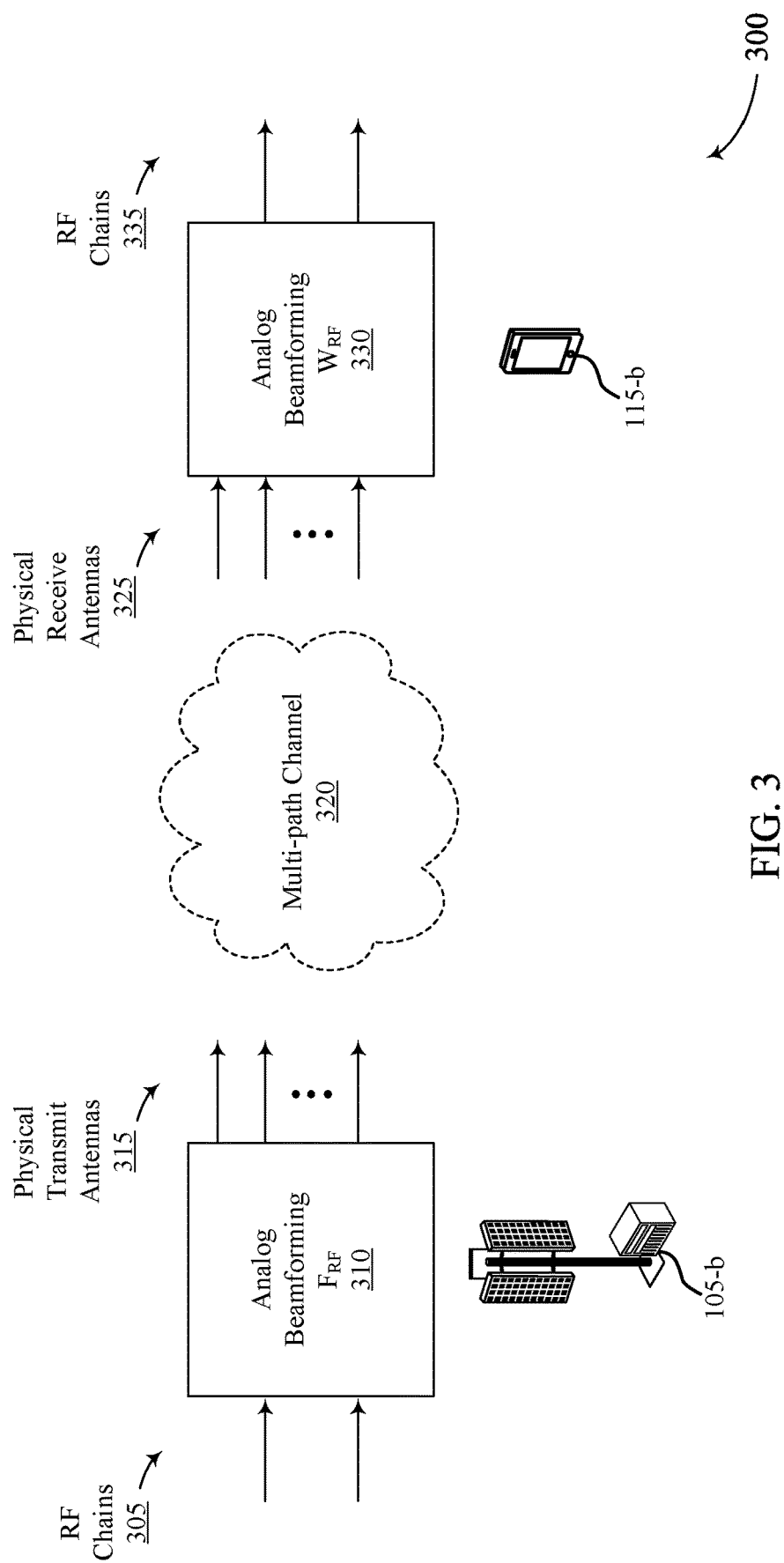

FIG. 3 illustrates an example of a wireless communications system 300 that supports iterative multi-beam selection with uplink-downlink beam training in accordance with aspects of the present disclosure. The wireless communications system 300 may include a base station 105-b and a UE 115-b, which may be examples of the corresponding devices described with reference to FIGS. 1 and 2. In some examples, the wireless communications system 300 may implement aspects of the wireless communications systems 100 and 200. For example, one or more of the base station 105-b or the UE 115-b may support improvements to power consumption, spectral efficiency, higher data rates and, in some examples, may promote high reliability and low latency for beamforming operations, among other benefits.

The base station 105-b may include components for directional communications including components for transmitting and receiving directional communications, including a radio frequency (RF) chain 305 ($N_{RF}^T$), an analog beamforming $F_{RF}$ component 310, and one or more physical transmit antennas 315. These components may be in electronic communication via one or more buses of the base station 105-b. Additionally, in some examples, these components can be implemented, at least in part, by one or both of a modem and a processor of the base station 105-b. The UE 115-b may, additionally, include components for directional communications including components for transmitting and receiving directional communications, including one or more physical receive antennas 325, an analog beamforming $W_{RF}$ component 330, and an RF chain 335 ($N_{RF}^R$). These components may be in electronic communication via one or more buses of the UE 115-b. Additionally, in some examples, these components can be implemented, at least in part, by one or both of a modem and a processor of the UE 115-b.

The base station 105-b and the UE 115-b may perform a beamforming operation in accordance with one or more codebooks to improve beamforming reliability and data rate for directional communications. The codebooks may have a number N possible beamforming vectors. In some examples, N may be dependent on $N_T$ and $N_R$, where $N_T$ refers to a number of physical transmit antennas 315 of the base station 105-b and $N_R$ refers to a number of physical receive antennas 325 of the UE 115-b. In some examples, the beamforming operation may involve the base station 105-b identifying, in accordance with the codebooks, an $f_n$ that results in a metric satisfying a threshold, where $f_n$ is a beamforming vector. Similarly, the beamforming operation may involve the UE 115-b identifying, in accordance with the codebooks, a $w_m$ that results in a metric satisfying a threshold, where $w_m$ is a beamforming vector.

In some examples, the metric may be a signal strength, and the signal strength may be dependent on a multi-path channel 320 (H) associated with the directional communications between the base station 105-b and the UE 115-b. In some examples, one or more of the base station 105-b or the UE 115-b may determine an effective channel of the multi-path channel 320 (H) with respect to one or more of the analog beamforming $F_{RF}$ component 310 or the analog beamforming $W_{RF}$ component 330. In other words, the full multi-path channel 320 (H) is unknown to one or more of the base station 105-b or the UE 115-b. One or more of the base station 105-b or the UE 115-b may determine and select a directional beam pair (e.g., ($f_n$, $w_m$)) for directional communications based on the effective channel, and in accordance with, the analog beamforming $F_{RF}$ component 310 or the analog beamforming $W_{RF}$ component 330. Thus, without the analog processing blocks (e.g., the analog beamforming $F_{RF}$ component 310 or the analog beamforming $W_{RF}$ component 330), a link between the base station 105-b and the UE 115-b cannot be established.

The analog beamforming $F_{RF}$ component 310 may correspond to a number of directional beams. For example, the analog beamforming $F_{RF}$ component 310 may be defined by the following beamforming matrix: $F_{RF}=[f_1\ f_2\ \ldots\ f_{N_{RF}^T}]$, where $f_1\ f_2\ \ldots\ f_{N_{RF}^T}$ are beamforming vectors of the beamforming matrix $F_{RF}$. In other words, each beamforming vector f may correspond to a directional beam of a number of directional beams. The analog beamforming $W_{RF}$ component 330 may also correspond to a number of directional beams. For example, the analog beamforming $W_{RF}$ component 330 may be defined by the following vector: $W_{RF}=[w_1\ w_2\ \ldots\ w_{N_{RF}^T}]$, where $w_1\ w_2\ \ldots\ w_{N_{RF}^T}$ are beamforming vectors of the beamforming matrix $W_{RF}$. In other words, each beamforming vector w may correspond to a directional beam of a number of directional beams. In some examples, an improper determination and selection of $F_{RF}$ and $W_{RF}$, by the base station 105-b and the UE 115-b, may change one or more rank properties of the effective channel, and beamforming operations may as a result not be improved (e.g., data rate).

Figure 4:
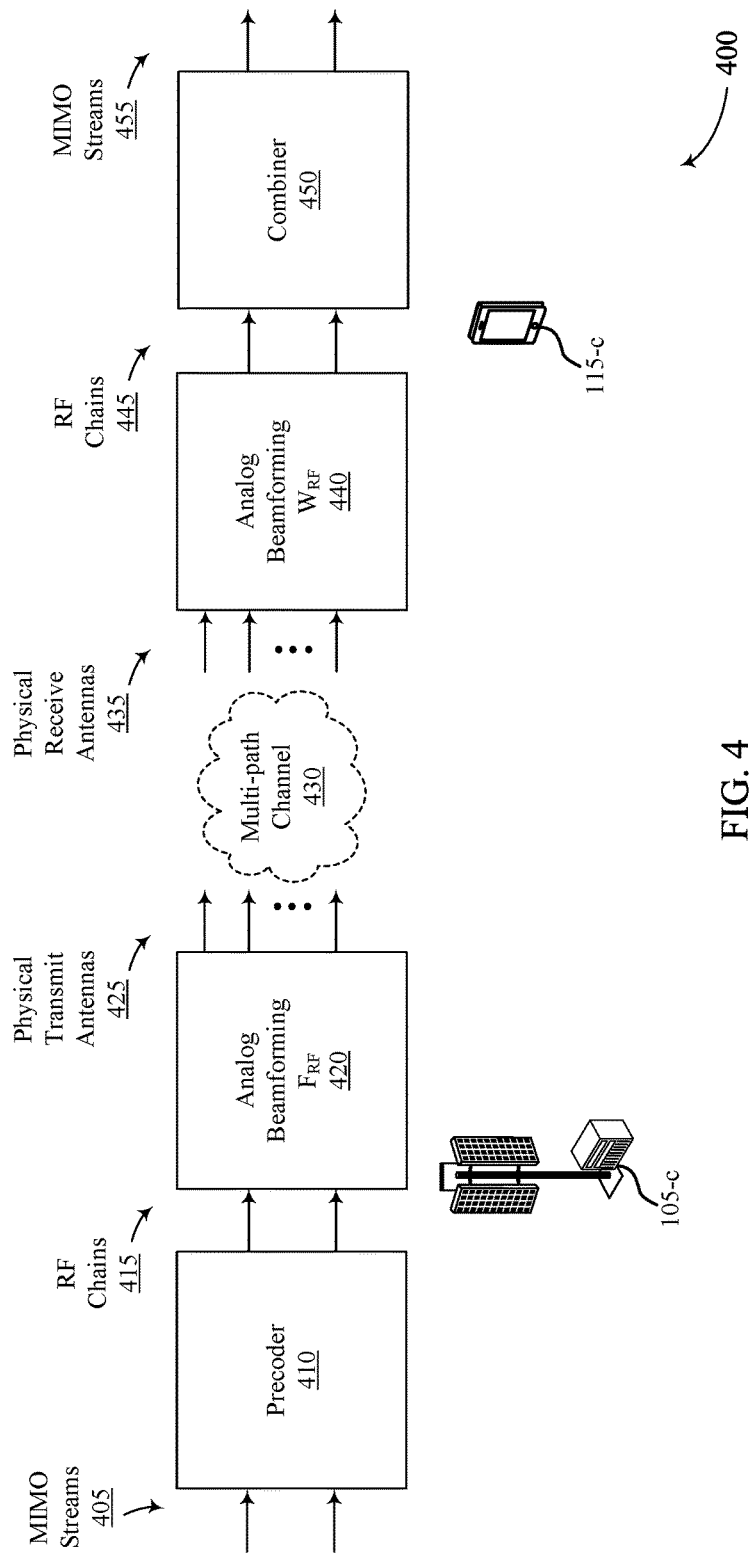

FIG. 4 illustrates an example of a wireless communications system 400 that supports iterative multi-beam selection with uplink-downlink beam training in accordance with aspects of the present disclosure. The wireless communications system 400 may include a base station 105-c and a UE 115-c, which may be examples of the corresponding devices described with reference to FIGS. 1 through 3. In some examples, the wireless communications system 400 may implement aspects of the wireless communications systems 100 through 300. For example, one or more of the base station 105-c or the UE 115-c may support improvements to power consumption, spectral efficiency, higher data rates and, in some examples, may promote high reliability and low latency for beamforming operations, among other benefits.

The base station 105-c may include components for directional communications including components for transmitting and receiving directional communications, including a precoder 410, an RF chain 415 ($N_{RF}^T$), an analog beamforming $F_{RF}$ component 420, and one or more physical transmit antennas 425 ($N_T$). These components may be in electronic communication via one or more buses of the base station 105-c. Additionally, in some examples, these components can be implemented, at least in part, by one or both of a modem and a processor of the base station 105-c. In some examples, the UE 115-c may, additionally or alternatively, be configured with one or more of the components, such as the precoder 410, the RF chain 415 ($N_{RF}^T$), the analog beamforming $F_{RF}$ component 420, and the one or more physical transmit antennas 425 ($N_T$), when the UE 115-c acts as the transmitting device.

The UE 115-c may, additionally, include components for directional communications including components for transmitting and receiving directional communications, including one or more physical receive antennas 435, an analog beamforming $W_{RF}$ component 440, an RF chain 445 ($N_{RF}^R$), and a combiner 450. These components may be in electronic communication via one or more buses of the UE 115-c.

Additionally, in some examples, these components can be implemented, at least in part, by one or both of a modem and a processor of the UE 115-c. In some examples, the base station 105-c may, additionally or alternatively, be configured with one or more of the components, such as the one or more physical receive antennas 435, the analog beamforming $W_{RF}$ component 440, the RF chain 445 ($N_{RF}^R$), and the combiner 450, when the base station 105-c acts as the receiving device.

In some examples, one or more of the base station 105-c or the UE 115-c may communicate directional communications on a wideband (e.g., over an entire bandwidth) or one or more subbands. A number of RF chains available for MIMO operations for one or more of the base station 105-c or the UE 115-c may be defined by the following expression: $N_{RF} \leq \min(N_T, N_R)$. In some examples, an analog precoder (e.g., for downlink directional communications) or a combiner (e.g., for uplink directional communications) at the base station 105-c may determine a beamforming matrix $F_{RF}$ as $F_{RF} \in C^{N_T \times N_{RF}}$, and each column $f_{RF} \in F_{RF}^v$ (i.e., the (analog) codebook at the base station 105-c). In some examples, an analog combiner (e.g., for downlink directional communications) or a precoder (e.g., for uplink directional communications) at the UE 115-c may determine a beamforming matrix $W_{RF}$ as $W_{RF} \in C^{N_R \times N_{RF}}$, and each column $w_{RF} \in W_{RF}^v$ (i.e., the (analog) codebook at the UE 115-c). Thus, $f_{RF} \in F_{RF}^v$, $W_{RF} \in W_{RF}^v$ may be an analog beamforming pair for single-input single-output (SISO) operation.

One or more of the base station 105-c or the UE 115-c may determine a beamforming pair for a transmit analog precoder (e.g., downlink: $F_{RF}$, uplink: $W_{RF}$) and beamforming pair for a receive analog combiner (e.g., downlink: $W_{RF}$, uplink: $F_{RF}$). In some examples, one or more of the base station 105-c or the UE 115-c may determine the beamforming pairs using one or more reference signals. For example, one or more of the base station 105-c or the UE 115-c may determine the beamforming pairs using one or more downlink reference signals or uplink reference signals. Examples of downlink reference signals include a CSI-RS, a synchronization signal block (SSB), and the like. Examples of uplink reference signals include a sounding reference signal (SRS), and the like. In some examples, downlink and uplink can use either the same reference signal or different reference signals. In some examples, if downlink reference signals are used, the UE 115-c may determine the best $F_{RF}$ and $W_{RF}$, and report the best $F_{RF}$ to the base station 105-c. Similarly, if uplink reference signals are used, the base station 105-c may determine the best $F_{RF}$ and $W_{RF}$, and report the best $W_{RF}$ to the UE 115-c.

In some examples, the base station 105-c may receive, at the precoder 410, one or more MIMO streams 405 ($N_S$). In some examples, one or more of the base station 105-c or the UE 115-c may be capable of supporting a number of MIMO streams ($N_S$) depending on a number of RF chains. In other words, one or more of the base station 105-c or the UE 115-c may be configured to support a number of MIMO streams ($N_S$) according to the following expression: $N_S \leq N_{RF}$. The precoder 410 may process the one or more MIMO streams 405 ($N_S$) by performing one or more beamforming related operations, such as a digital beamforming operation, an inverse fast Fourier transform (IFFT) operation, or a digital-to-analog conversion (DAC) operation, among other examples. The precoder 410 may then forward, via the RF chain 415, the processed one or more MIMO streams 405 (e.g., in the form of packets) to the analog beamforming $F_{RF}$ component 420. The analog beamforming $F_{RF}$ component 420 may determine and select one or more directional beams (e.g., based on one or more beamforming elements of a beamforming matrix $W_{RF}$ provided by the UE 115-c, or by referencing a codebook) and map them to the one or more physical transmit antennas 425 for transmitting to the UE 115-c over a multi-path channel 430.

The UE 115-c may receive one or more packets (e.g., associated with the processed one or more MIMO streams 405) on the one or more physical receive antennas 435. In some examples, the UE 115-c may receive and perform a de-mapping operation via the analog beamforming $W_{RF}$ component 440 (e.g., based on one or more beamforming elements of a beamforming matrix $F_{RF}$ provided by the base station 105-c, or by referencing a codebook). The analog beamforming $W_{RF}$ component 440 may forward the one or more packets to the RF chain 445, which may then forward the one or more packets to the combiner 450. The combiner 450 may process the one or more packets (e.g., in the form of packets) by performing one or more beamforming related operations, such as a digital processing beamforming operation, a fast Fourier transform (FFT) operation, or an analog-to-digital conversion (ADC) operation, among other examples. The combiner 450 may then output the one or more packets in the form of one or more MIMO streams 455.

Additionally or alternatively, one or more of the base station 105-c or the UE 115-c may determine one or more beamforming pairs for a transmit baseband precoder (e.g., downlink: $F_{BBS}[k]$, uplink: $W_{BBS}[k]$) or a receive baseband combiner (e.g., downlink: $W_{BBS}[k]$, uplink: $F_{BBS}[k]$). A baseband precoder (for downlink) or a baseband combiner (for uplink) at the base station 105-c may thus be defined by the following expression: $F_{BB}[k] \in C^{N_{RF} \times N_S}$. Similarly, a baseband combiner (for downlink) or a baseband precoder (for uplink) at the UE 115-c may be defined by the following expression: $W_{BB}[k] \in C^{N_{RF} \times N_S}$. The effective precoder/combiner at the base station 105-c may thus be represented by the following expression: $F_T[k] = F_{RF}F_{BB}[k]$, and the effective combiner/precoder at the UE 115-c may be represented by the following expression: $W_R[k] = W_{RF}W_{BB}[k]$. In some examples, one or more of the precoder 410 or the combiner 450 may be dependent on a subband or a subcarrier (e.g., OFDM subcarrier) or a multi-tap for single carrier implementations. In some examples, k may be a subband value from 1 to $N_{SB}$, for example a subband or a subcarrier index (e.g., OFDM subcarrier index) or a tap index in single carrier implementations.

In some examples, a baseband received signal vector at a subband k may be defined by the following equation:

$$y[k] = W^*_{BB}[k]W^*_{RF}H[k]F_{RF}F_{BB}[k]s[k] + W^*_{BB}[k]W^*_{RF}n[k] \quad (1)$$

for $k=1, \ldots, N_{SB}$, where H[k] is the multi-path channel 430 at subband k, s[k] is a transmit signal at subband index k (e.g., a signal transmitted by the base station 105-c), $F_{RF}F_{BB}[k]$ is the precoder 410 at a transmitting-side (e.g., at the base station 105-c), and $W_{BB}[k]W_{RF}$ is the combiner 450 at a receiving-side (e.g., at the UE 115-c). In some examples, the $W_{RF}$ and the $F_{RF}$ are wideband, radio frequency BF (i.e., common for all k) while the $W_{BB}[k]$ and the $F_{BB}[k]$ are subband baseband BF (i.e., dependent on subband index k). In some examples, n[k] may be noise at a subband index k. The noise n[k] at a subband index k may be Gaussian noise. In some other examples, the noise n[k] at a subband index k may be thermal noise, intermodulation noise, electronic noise, quantum noise, among other examples.

One or more of the base station 105-c or the UE 115-c may support improvements in determining mutual information (MI) (e.g., maximizing an achievable rate) for a (radio frequency) codebook. In some examples, one or more of the base station 105-c or the UE 115-c may determine the mutual information in accordance with the following equation:

$$MI = \max_{F_{RF}, W_{RF}} \sum_{k=1}^{N_{SB}} \log_2 \left| I_{N_S} + \frac{SNR}{N_S} \hat{H}[k]\bar{H}^*[\bar{k}] \right| \quad (2)$$

where $\hat{H}[k]=W^*_{BB}[k]W^*_{RF}H[k]F_{RF}F_{BB}[k]$, SNR is the signal-to-noise ratio, and $N_S$ corresponds to one or more streams (e.g., MIMO streams), and $|A|$ stands for the determinant of square matrix A. This equation assumes the analog and baseband combiners are designed such that the noise variance is an identity matrix, and techniques as discussed herein also provides such a property. In some examples, one or more of the base station 105-c or the UE 115-c may determine the mutual information for $F_{BB}[1], \ldots, F_{BB}[N_{SB}]$ and $W_{BB}[1], \ldots, W_{BB}[N_{SB}]$. One or more of the base station 105-c or the UE 115-c may determine the mutual information, in some examples, such that $F_{RF} \in \mathcal{F}_{RF}$ and $W_{RF} \in \mathcal{W}_{RF}$, where $\mathcal{F}_{RF}$ is an analog codebook for $F_{RF}$ and where $\mathcal{W}_{RF}$ is an analog codebook for $W_{RF}$.

Figure 5:
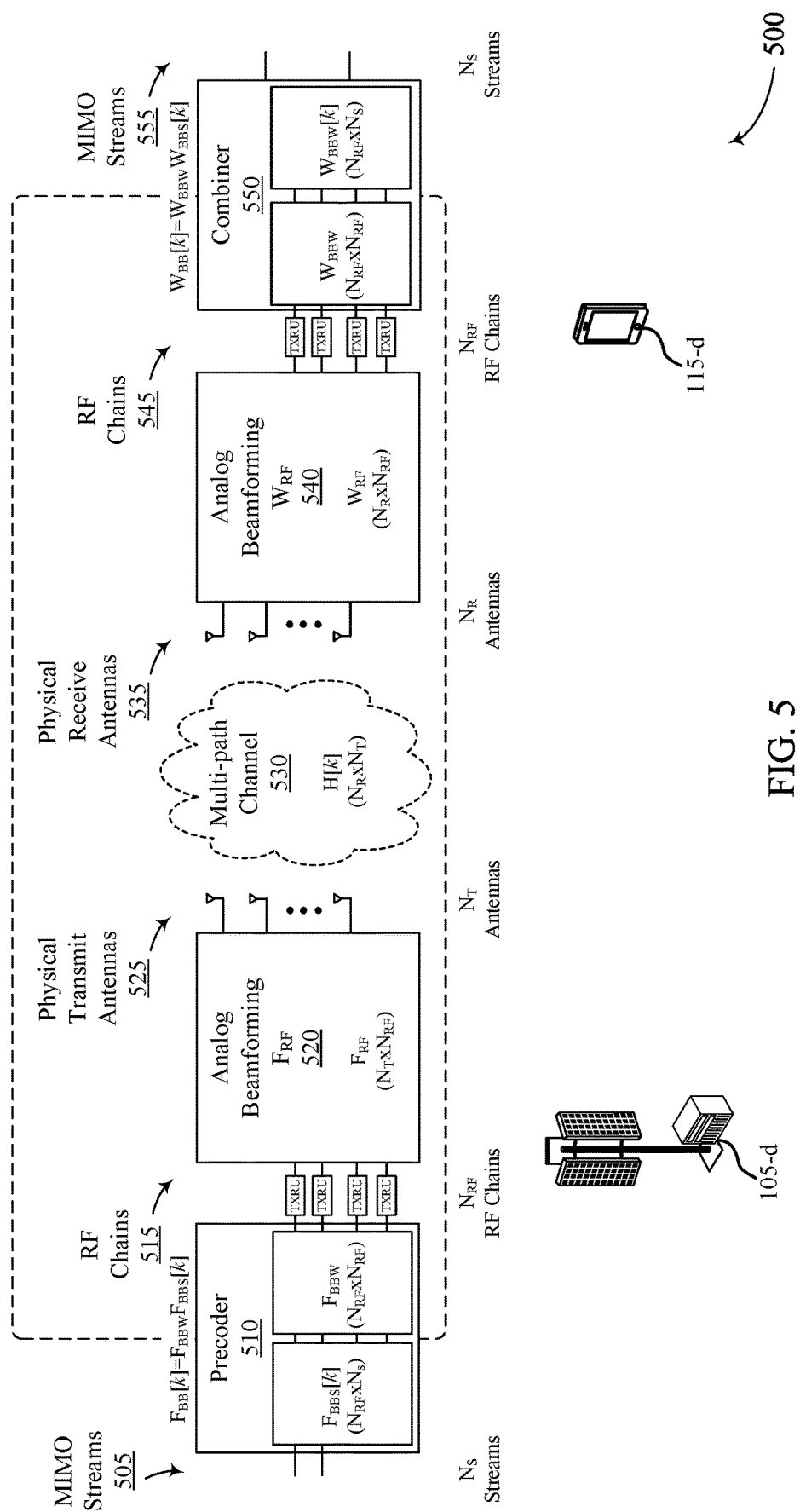

FIG. 5 illustrates an example of a wireless communications system 500 that supports iterative multi-beam selection with uplink-downlink beam training in accordance with aspects of the present disclosure. The wireless communications system 500 may include a base station 105-d and a UE 115-d, which may be examples of the corresponding devices described with reference to FIGS. 1 through 4. In some examples, the wireless communications system 500 may implement aspects of the wireless communications systems 100 through 400. For example, one or more of the base station 105-d or the UE 115-d may support improvements to power consumption, spectral efficiency, higher data rates and, in some examples, may promote high reliability and low latency for beamforming operations, among other benefits.

The base station 105-d may include components for directional communications including components for transmitting and receiving directional communications, including a precoder 510, an RF chain 515 ($N_{RF}^T$) (e.g., a transceiver unit (TXRU)), an analog beamforming $F_{RF}$ component 520, and one or more physical transmit antennas 525 ($N_T$). These components may be in electronic communication via one or more buses of the base station 105-d. Additionally, in some examples, these components can be implemented, at least in part, by one or both of a modem and a processor of the base station 105-d. In some examples, the UE 115-d may, additionally or alternatively, be configured with one or more of the components, such as the precoder 510, the RF chain 515 ($N_{RF}^T$) (e.g., a transceiver unit (TXRU)), the analog beamforming $F_{RF}$ component 520, and the one or more physical receive antennas 525 ($N_T$), when the UE 115-d acts as the transmitting device.

The UE 115-d may, additionally, include components for directional communications including components for transmitting and receiving directional communications, including one or more physical receive antennas 535, an analog beamforming $W_{RF}$ component 540, an RF chain 545 ($N_{RF}^R$), and a combiner 550. These components may be in electronic communication via one or more buses of the UE 115-d. Additionally, in some examples, these components can be implemented, at least in part, by one or both of a modem and a processor of the UE 115-d. In some examples, the base station 105-d may, additionally or alternatively, be configured with one or more of the components, such as the one or more physical receive antennas 535, the analog beamforming $W_{RF}$ component 540, the RF chain 545 ($N_{RF}^R$), and the combiner 550, when the base station 105-d acts as the receiving device.

In some examples, the base station 105-d may receive, at the precoder 510, one or more MIMO streams 505 ($N_S$). In some examples, one or more of the base station 105-d or the UE 115-d may be capable of supporting a number of MIMO streams ($N_S$) depending on a number of RF chains. In other words, one or more of the base station 105-d or the UE 115-d may be configured to support a number of MIMO streams ($N_S$) according to the following expression: $N_S \leq N_{RF}$. The precoder 510 may process the one or more MIMO streams 505 ($N_S$) by performing one or more beamforming related operations, such as a digital beamforming operation, an IFFT operation, or a DAC operation, among other examples. The precoder 510 may then forward, via the RF chain 515, the processed one or more MIMO streams 505 (e.g., in the form of packets) to the analog beamforming $F_{RF}$ component 520. The analog beamforming $F_{RF}$ component 520 may determine and select one or more directional beams (e.g., based on one or more beamforming vectors of a beamforming matrix $W_{RF}$ provided by the UE 115-d, or by referencing a codebook) and map them to the one or more physical transmit antennas 525 for transmitting to the UE 115-d over a multi-path channel 530 (e.g., also referred to as H[k]). In some examples, a baseband effective channel at a subband k may be defined by the following expression:

$$H_{\text{eff}}[k]=W^*_{BBW}W^*_{RF}H[k]F_{RF}F_{BBW}.$$

The UE 115-d may receive one or more packets (e.g., associated with the processed one or more MIMO streams 505) on the one or more physical receive antennas 535. In some examples, the UE 115-d may receive and perform a de-mapping operation via the analog beamforming $W_{RF}$ component 540 (e.g., based on one or more beamforming elements of a beamforming matrix $F_{RF}$ provided by the base station 105-d, or by referencing a codebook). The analog beamforming $W_{RF}$ component 540 may forward the one or more packets to the RF chain 545, which may then forward the one or more packets to the combiner 550. The combiner 550 may process the one or more packets (e.g., in the form of packets) by performing one or more beamforming related operations, such as a digital processing beamforming operation, an FFT operation, or an ADC operation, among other examples. The combiner 550 may then output the one or more packets in the form of one or more MIMO streams 555.

One or more of the base station 105-d or the UE 115-d may determine one or more beamforming pairs for a transmit baseband precoder (e.g., downlink: $F_{BBS}[k]$, uplink: $W_{BBS}[k]$) or a receive baseband combiner (e.g., downlink: $W_{BBS}[k]$, uplink: $F_{BBS}[k]$). In some examples, one or more of the base station 105-d or the UE 115-d may determine a $F_{RF}$ and an $W_{RF}$, which may be wideband, BF (i.e., common for all subband indices k). In some examples, one or more of the base station 105-d or the UE 115-d may determine a $F_{BBW}$ and an $W_{BBW}$, which may be wideband, BF (i.e., at a subband index k).

In some examples, one or more of the base station 105-d or the UE 115-d may determine one or more of $F_{RF}$, $F_{BBW}$, $F_{BBS}[k]$, $W_{RF}$, $W_{BBW}$, and $W_{BBS}[k]$ sequentially for all subcarriers k. For example, one or more of the base station 105-d or the UE 115-d may initially determine $F_{RF}$ and $W_{RF}$. In some examples, $F_{BBW}$ and $W_{BBW}$ may depend exclusively on $F_{RF}$ and $W_{RF}$. For example, the base station 105-d may determine $F_{BBW}$ based on the following expressions: $F_{BBW}=(F^*_{RF}F_{RF})^{-1/2}$, and the UE 115-d may determine $W_{BBW}$ based on the following expressions: $W_{BBW}=(W^*_{RF}W_{RF})^{-1/2}$. In some examples, $F_{RF}$ and $W_{RF}$ may be exclusively dependent on H[k]'s (i.e., the multi-path channel 530 at subbands indices k). One or more of the base station 105-d or the UE 115-d may thus determine a beamforming pair $\{F_{RF}, W_{RF}\}$ according to the following equation:

$$\{F_{RF}, W_{RF}\} = \operatorname*{argmax}_{F_{RF} \in F_{RF}, W_{RF} \in W_{RF}} \quad (3)$$

$$\sum_{k=1}^{N_{SB}} \sum_{j=1}^{N_S} \log_2 \left| 1 + \frac{SNR}{N_S} \lambda_j^2 \left( (W_{RF}^* W_{RF})^{-\frac{1}{2}} W_{RF}^* H[k] F_{RF} (F_{RF}^* F_{RF})^{-1/2} \right) \right|$$

where $\lambda_j (A)$ denotes the j-th singular value of A. In some examples, the equation (3) may be simplified to the following equation:

$$\{F_{RF}, W_{RF}\} = \operatorname*{argmax}_{F_{RF} \in F_{RF}, W_{RF} \in W_{RF}} \sum_{k=1}^{N_{SB}} \sum_{j=1}^{N_S} \log_2 \left| 1 + \frac{SNR}{N_S} \lambda_j^2 (H_{\mathit{eff}}[k]) \right| \quad (4)$$

where $H_{\mathit{eff}}[k]$ is $$\left( (W_{RF}^* W_{RF})^{-\frac{1}{2}} W_{RF}^* H[k] F_{RF} (F_{RF}^* F_{RF})^{-\frac{1}{2}} \right).$$

Once one or more of the base station 105-d or the UE 115-d determine $F_{RF}$, $W_{RF}$, one or more of the base station 105-d or the UE 115-d may determine $F_{BBS}[k]$ and $W_{BBS}[k]$, which may depend exclusively on $H_{\mathit{eff}}[k]$. As such, $F_{BBS}[k]$ and $W_{BBS}[k]$ may be the matrices composed of the dominant $N_S$ right and left singular vectors of $H_{\mathit{eff}}[k]$'s.

In some examples, the determining $\{F_{RF}, W_{RF}\}$ may involve one or more of the base station 105-d or the UE 115-d performing an exhaustive search, which may result in high computational complexity and high usage of device resources for the base station 105-d or the UE 115-d. The following is an example exhaustive search for determining $F_{RF}$ and $W_{RF}$ at the base station 105-d and the UE 115-d without knowing H[k] explicitly. For example, one or more of the base station 105-d or the UE 115-d may use a beam sweeping operation (i.e., by testing all possible candidates) for $F_{RF}$ and $W_{RF}$. In other words, one or more of the base station 105-d or the UE 115-d may use a beam sweeping operation to determine candidates $F_{RF}$ and $W_{RF}$ using the equation (3). As such, one or more of the base station 105-d or the UE 115-d may determine $F_{RF} \in F_{RF} = \{F_{RF,1}, \ldots, F_{RF,P}\}$ and $W_{RF} \in W_{RF} = \{W_{RF,1}, \ldots, W_{RF,Q}\}$. In some examples, the elements (i.e., $\{F_{RF,1}, \ldots, F_{RF,P}\}$) in $F_{RF}$ may be referred to as p-elements, while the elements (i.e., $\{W_{RF,1}, \ldots, W_{RF,Q}\}$) in $W_{RF}$ may be referred to as q-elements. Accordingly, by determining mutual information for all possible PQ combinations of (p, q), one or more of the base station 105-d or the UE 115-d may determine (or obtain) a best solution $p_{best}$ and $q_{best}$.

In some examples, however, P and Q may be so large that the PQ calculations of the mutual information can be infeasible for one or more of the base station 105-d or the UE 115-d. For example, $F_{RF} \in F_{RF} = \{F_{RF,1}, \ldots, F_{RF,p}, \ldots, F_{RF,P}\}$, where $F_{RF}$: $F_{RF}$ matrix codebook composed of P codewords derived from $C_{TX\ CB}$. In some examples, $F_{RF,p} = [f_{p,1}, \ldots, f_{p,i}, \ldots f_{p,N_{RF}^T}]$, and $f_{p,i} \in C_{TX\ CB} = \{f_{RF,1}, f_{RF,2}, \ldots, f_{RF,N_{CB}^T}\}$, where $C_{TX\ CB}$ is a predefined $f_{RF}$ vector codebook composed of $N_{CB}^T$ codewords. Each column in $F_{RF,p}$ (i.e., $f_{p,i}$) may be selected from a transmit analog beamforming codebook composed of $N_{CB}^T$ codewords. Thus, P (may be a number of all possible combinations of $F_{RF,p}$) may be defined by $$\binom{N_{CB}^T}{N_{RF}^T},$$

which may be a very large size. For example, P may be 635376 when $N_{CB}^T = 64$ and $N_{RF}^T = 4$. Additionally, Q (may be a number of all possible combinations of $W_{RF,q}$) may be defined by $$\binom{N_{CB}^R}{N_{RF}^R},$$

which may also be a very large size. For example, Q may be 635376 when $N_{CB}^R = 64$ and $N_{RF}^R = 4$. As such, the exhaustive search approach may have a high computational complexity.

As demand for device efficiency increases, one or more of the base station 105-d or the UE 115-d may support an iterative method for determining $\{R_{RF}, W_{RF}\}$. According to the iterative method, one or more of the base station 105-d or the UE 115-d may select a best $\{f^*_{RF}, w^*_{RF}\}$ at each iteration (also referred to as cycle) i≤$N_{RF}$ given a radio frequency beamformer of a previous iteration (or step), for example, $F_{RF}^{(i-1)} \in C^{N_T \times i-1}$ and $W_{RF}^{(i-1)} \in C^{N_R \times i-1}$. As such, one or more of the base station 105-d or the UE 115-d may target for the i-th iteration to improve (e.g., maximize) the following equation:

$$I^{(i)}(F_{RF}^v, W_{RF}^v) = \max_{f_{RF} \in C^{N_T \times 1}, w_{RF} \in C^{N_R \times 1}} \sum_{j=1}^{i} \log_2 \quad (5)$$

$$\left| 1 + \frac{SNR}{N_S} \lambda_j^2 \left( (\hat{W}_{RF}^* \hat{W}_{RF})^{-\frac{1}{2}} \hat{W}_{RF}^* H[k] \hat{F}_{RF} (\hat{F}_{RF}^* \hat{F}_{RF})^{-1/2} \right) \right|$$

such that $f_{RF} \in F_{RF}^v$ and $W_{RF} \in W_{RF}^v$, and where $\hat{F}_{RF} = [F_{RF}^{(i-1)}, f_{RF}]$ and $\hat{W}_{RF} = [W_{RF}^{(i-1)}, w_{RF}]$. In some examples, one or more of the base station 105-d or the UE 115-d may determine $F_{RF}^{(i)}$ and $W_{RR}^{(i)}$ for a current iteration according to the following expressions: $F_{RF}^{(i)} = [F_{RF}^{(i-1)}, f^*_{RF}]$ and $W_{RF}^{(i)} = [W_{RF}^{(i-1)}, w^*_{RF}]$. The iterative method therefore exclusively involves a search over a single beam pair, and at each stage i, the best beamformers for all k≤i is determined by one or more of the base station 105-d or the UE 115-d. In some examples, the one or more of the base station 105-d or the UE 115-d may promote additional efficiencies by increasing a rank transmission, which may involve fewer iterations for determining beam pairs.

One or more of the base station 105-d or the UE 115-d may support a signaling mechanism related to the iterative method for determining $\{F_{RF}, W_{RF}\}$. In some examples, the signaling mechanism may include one or more of the base station 105-d or the UE 115-d identifying a best transmit directional beam and receive directional beam to commence the iterative method for determining $\{F_{RF}, W_{RF}\}$. As such, one or more of the base station 105-d or the UE 115-d may introduce a subsequent (e.g., next) best transmit-receive combination in accordance with the metric (e.g., mutual information)

$$\sum_{j=1}^{i} \log_2 \left| 1 + \frac{SNR}{N_S} \lambda_j^2 \left( (\hat{W}_{RF}^* \hat{W}_{RF})^{-\frac{1}{2}} \hat{W}_{RF}^* H[k] \hat{F}_{RF} (\hat{F}_{RF}^* \hat{F}_{RF})^{-1/2} \right) \right|.$$

One or more of the base station 105-d or the UE 115-d may iterate for a threshold number of $N_{RF}$. Other signaling details are similar to the exhaustive search method, with the exception that a search-space may be different between the iterative search method and the exhaustive search method. Examples of the exhaustive search method, the iterative method and signaling are described with reference to FIGS. 6 through 9.

Figure 6:
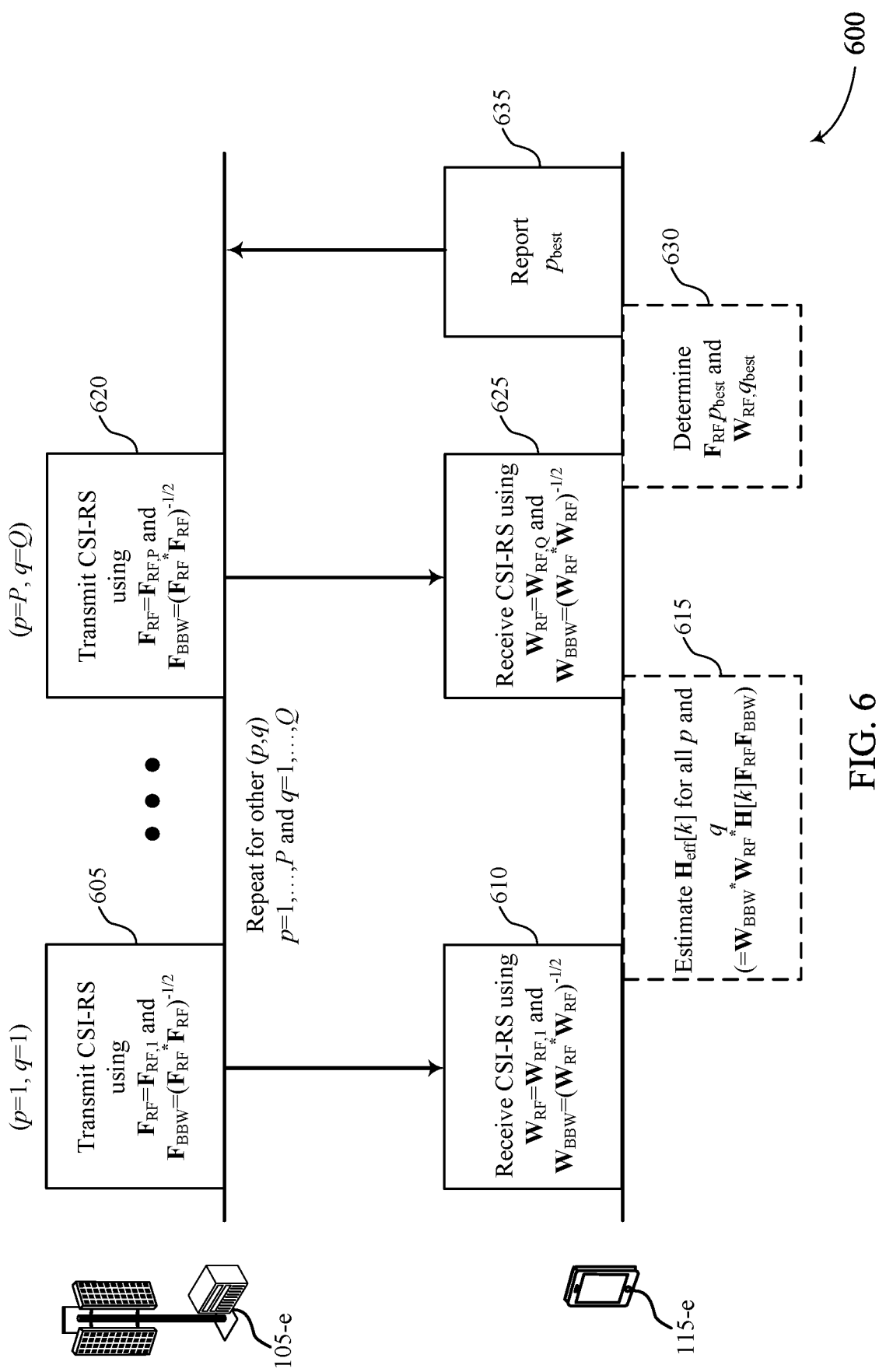
FIG. 6 illustrates an example of a process flow that supports an exhaustive search for multi-beam selection with uplink-downlink beam training in accordance with aspects of the present disclosure.

FIG. 6 illustrates an example of a process flow 600 that supports an exhaustive search for multi-beam selection with uplink-downlink beam training in accordance with aspects of the present disclosure. The process flow 600 may illustrate an exhaustive search for determining a transmit analog precoder ($F_{RF}$) and a receive analog combiner ($W_{RF}$) using a downlink reference signal. In some examples, the process flow 600 may implement aspects of the wireless communications systems 100 through 500, as described with reference to FIGS. 1 through 5. For example, the process flow 600 may be based on a configuration by a base station 105 or a UE 115, and implemented by the UE 115 for reduced power consumption, spectral efficiency, higher data rates and, in some examples, may promote high reliability and low latency for beamforming operations, among other benefits.

The process flow 600 may include a base station 105-e and a UE 115-e, which may be examples of base stations 105 and UEs 115 as described with reference to FIGS. 1 through 5. In the following description of the process flow 600, the operations between the base station 105-e and the UE 115-e may be transmitted in a different order than the example order shown, or the operations performed by the base station 105-e and the UE 115-e may be performed in different orders or at different times. Some operations may also be omitted from the process flow 600, and other operations may be added to the process flow 600.

At 605, the process flow 600 may commence with the base station 105-e transmitting a CSI-RS using $F_{RF}=F_{RF,1}$ and $F_{BBW}=(F^*_{RF}F_{FR})^{-1/2}$. At 610, the UE 115-a may receive the CSI-RS using $W_{RF}=W_{RF,1}$ and $W_{BBW}=(W^*_{RF}W_{RF})^{-1/2}$. At 615, the UE 115-a may estimate $H_{\textit{eff}}[k]$ for all p and q. In some examples, the UE 115-a may estimate $H_{\textit{eff}}[k]$ to be $W^*_{BBW}W^*_{RF}H[K]F_{RF}F_{BBW}$ for all p and q. Thus, the base station 105-e may select a p-element from a codebook $F_{RF}$, for example, p=1, and transmit the CSI-RS on a directional beam corresponding to p=1. Similarly, the UE 115-e may select a q-element from a codebook $W_{RF}$, for example, q=1, and receive the CSI-RS on a directional beam corresponding to q=1.

In some examples, the base station 105-e and the UE 115-e may repeat the operations in 605, 610, and 615 for other combinations of (p, q), for example, p=1, . . . , P and q=1, . . . , Q. For example, at 620, the base station 105-e may transmit a CSI-RS using $F_{RF}=F_{RF,P}$ and $F_{BBW}=(F^*_{RF}F_{RF})^{-1/2}$. At 625, the UE 115-e may receive the CSI-RS using $W_{RF}=W_{RF,Q}$ and $W_{BBW}=(W^*_{RF}W_{RF})^{-1/2}$, and estimate $H_{\textit{eff}}[k]$ for P and Q. At 630, the UE 115-e may determine a $F_{RF,p_{best}}$ and a $W_{RF,p_{best}}$. At 635, the UE 115-e may report the $p_{best}$ to the base station 105-e. Thus, the final results may be $F_{RF}=F_{RF,p_{best}} \in F_{RF}$ and $W_{RF}=W_{RF,p_{best}} \in W_{RF}$.

Figure 7:
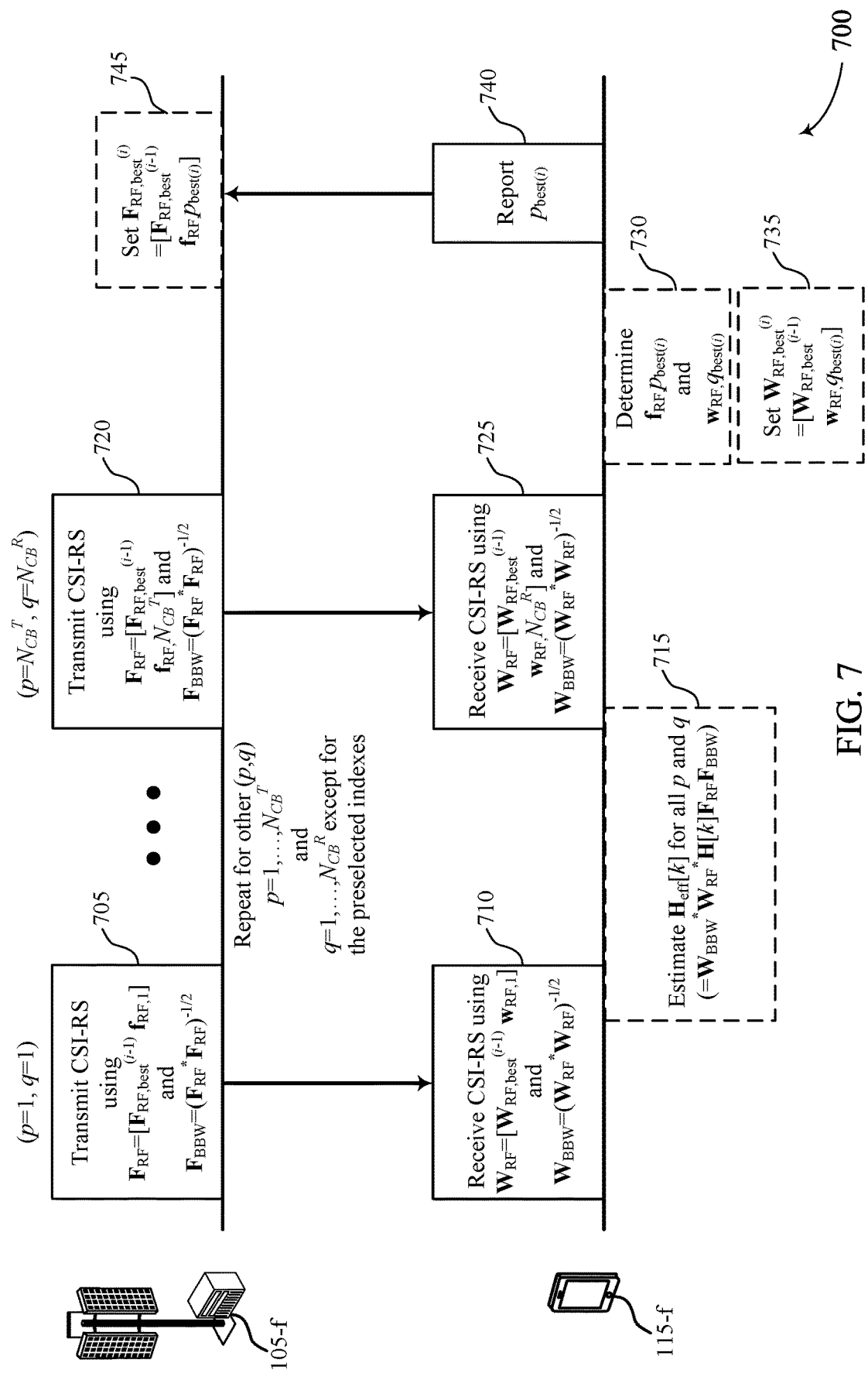
FIG. 7 illustrates an example of a process flow that supports an iterative multi-beam selection with uplink-downlink beam training in accordance with aspects of the present disclosure.

FIG. 7 illustrates an example of a process flow 700 that supports iterative multi-beam selection with uplink-downlink beam training in accordance with aspects of the present disclosure. The process flow 700 may illustrate an iterative search for determining a transmit analog precoder ($F_{RF}$) and a receive analog combiner ($W_{RF}$) using a downlink reference signal. In some examples, the process flow 700 may implement aspects of the wireless communications systems 100 through 500, as described with reference to FIGS. 1 through 5. For example, the process flow 700 may be based on a configuration by a base station 105 or a UE 115, and implemented by the UE 115 for reduced power consumption, spectral efficiency, higher data rates and, in some examples, may promote high reliability and low latency for beamforming operations, among other benefits.

The process flow 700 may include a base station 105-f and a UE 115-f, which may be examples of base stations 105 and UEs 115 as described with reference to FIGS. 1 through 5. In the following description of the process flow 700, the operations between the base station 105-f and the UE 115-f may be transmitted in a different order than the example order shown, or the operations performed by the base station 105-f and the UE 115-f may be performed in different orders or at different times. Some operations may also be omitted from the process flow 700, and other operations may be added to the process flow 700.

At 705, the process flow 700 may commence with the base station 105-f transmitting a CSI-RS using $F_{RF}=[F_{RF,best}^{(i-1)}f_{RF,1}]$ and $F_{BBW}=(F^*_{RF}F_{RF})^{-1/2}$. At 710, the UE 115-a may receive the CSI-RS using $W_{RF}=[W_{RF,best}^{(i-1)}w_{RF,1}]$ and $W_{BBW}=(W^*_{RF}W_{RF})^{-1/2}$. At 715, the UE 115-a may estimate $H_{\textit{eff}}[k]$ for all p and q. In some examples, the UE 115-f may estimate $H_{\textit{eff}}[k]$ to be $W^*_{BBW}W^*_{RF}H[K]F_{RF}F_{BBW}$ for all p and q. Thus, the base station 105-f may select a p-element from a matrix (codebook) $F_{RF}$, for example, p=1, and transmit the CSI-RS on a directional beam corresponding to p=1. Similarly, the UE 115-f may select a q-element from a matrix (codebook) $W_{RF}$, for example, q=1, and receive the CSI-RS on a directional beam corresponding to q=1.

In some examples, the base station 105-f and the UE 115-f may repeat the operations in 705, 710, and 715 for other combinations of (p, q), for example, p=1, . . . , $N_{CB}^T$ and q=1, . . . , $N_{CB}^T$ except for the preselected indexes. For example, at 720, the base station 105-f may transmit a CSI-RS using $F_{RF}=[F_{RF,best}^{(i-1)}f_{RF,N_{CB}^T}]$ and $F_{BBW}=(F^*_{RF}F_{RF})^{-1/2}$. At 725, the UE 115-f may receive the CSI-RS using $W_{RF}=[W_{RF,best}^{(i-1)}w_{RF,N_{CB}^R}]$ and $W_{BBW}=(W^*_{RF}W_{RF})^{-1/2}$, and estimate $H_{\textit{eff}}[k]$ for $p=N_{CB}^T$ and $q=N_{CB}^R$. At 730, the UE 115-f may determine a $f_{RF,p_{best(i)}}$ and a $w_{RF,p_{best(i)}}$.

At 735, the UE 115-f may set $W_{RF,best}^{(i)}=[W_{RF,best}^{(i-1)}w_{RF,q_{best(i)}}]$. At 740, the UE 115-f may report the $p_{best(i)}$ to the base station 105-f. At 745, the base station 105-f may set $F_{RF,best}^{(i)}=[F_{RF,best}^{(i-1)}f_{RF,q_{best(i)}}]$. The base station 105-f and the UE 115-f may repeat the above operations for i=1, . . . , $N_{RF}$ (i.e., $N_{RF}$ iterations). Thus, the final results may be $$F_{RF} = [f_{RF,p_{best(1)}} \cdots f_{RF,p_{best(N_{RF})}}], \text{ where } f_{RF,p_{best(i)}} \in C_{TX\ CB},$$

$$\text{and } W_{RF} = [w_{RF,q_{best(1)}} \cdots w_{RF,q_{best(N_{RF})}}], \text{ where } w_{RF,q_{best(i)}} \in C_{RX\ CB}.$$

Figure 8:
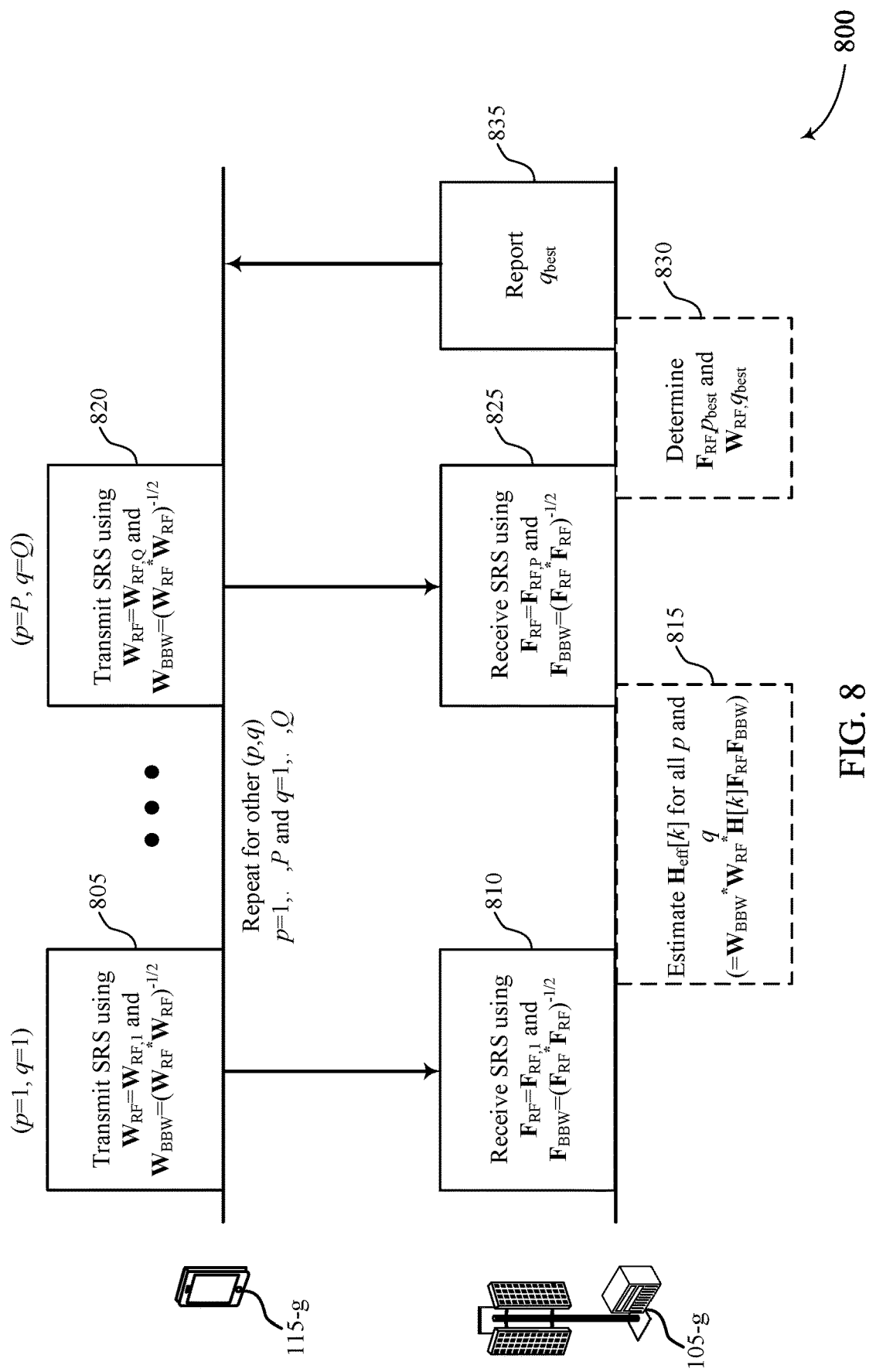
FIG. 8 illustrates an example of a process flow that supports an exhaustive search for multi-beam selection with uplink-downlink beam training in accordance with aspects of the present disclosure

FIG. 8 illustrates an example of a process flow 800 that supports an exhaustive search for multi-beam selection with uplink-downlink beam training in accordance with aspects of the present disclosure. The process flow 800 may illustrate an exhaustive search for determining a transmit analog precoder ($F_{RF}$) and a receive analog combiner ($W_{RF}$) using an uplink reference signal. In some examples, the process flow 800 may implement aspects of the wireless communications systems 100 through 500, as described with reference to FIGS. 1 through 5. For example, the process flow 800 may be based on a configuration by a base station 105 or a UE 115, and implemented by the UE 115 for reduced power consumption, spectral efficiency, higher data rates and, in some examples, may promote high reliability and low latency for beamforming operations, among other benefits.

The process flow 800 may include a base station 105-g and a UE 115-g, which may be examples of base stations 105 and UEs 115 as described with reference to FIGS. 1 through 5. In the following description of the process flow 800, the operations between the base station 105-g and the UE 115-g may be transmitted in a different order than the example order shown, or the operations performed by the base station 105-g and the UE 115-g may be performed in different orders or at different times. Some operations may also be omitted from the process flow 800, and other operations may be added to the process flow 800.

At 805, the process flow 800 may commence with the UE 115-g transmitting an SRS using $W_{RF}=W_{RF,1}$ and $W_{BBW}=(W^*_{RF}W_{RF})^{-1/2}$. At 810, the base station 105-g may receive the SRS using $F_{RF}=F_{RF,1}$ and $F_{BBW}=(F^*_{RF}F_{RF})^{-1/2}$. At 815, the base station 105-g may estimate $H_{eff}[k]$ for all p and q. In some examples, the base station 105-g may estimate $H_{eff}[k]$ to be $W^*_{BBW}W^*_{RF}H[K]F_{RF}F_{BBW}$ for all p and q. Thus, the base station 105-g may select a p-element from a matrix (codebook) $F_{RF}$, for example, p=1, and receive the SRS on a directional beam corresponding to p=1. Similarly, the UE 115-g may select a q-element from a matrix (codebook) $W_{RF}$, for example, q=1, and transmit the SRS on a directional beam corresponding to q=1.

In some examples, the base station 105-g and the UE 115-g may repeat the operations in 805, 810, and 815 for other combinations of (p, q), for example, p=1, . . . , P and q=1, . . . , Q. For example, at 820, the UE 115-g may transmit an SRS using $F_{RF}=F_{RF,P}$ and $F_{BBW}=(R^*_{RF}F_{RF})^{-1/2}$. At 825, the base station 105-g may receive the SRS using $W_{RF}=W_{RF,Q}$ and $W_{BBW}=(W^*_{RF}W_{RF})^{-1/2}$, and estimate $H_{eff}[k]$ for P and Q. At 830, the base station 105-g may determine a $F_{RF,p_{best}}$ and a $W_{RF,p_{best}}$. At 835, the base station 105-g may report the $q_{best}$ to the UE 115-g. Thus, the final results may be $F_{RF}=F_{RF,P_{best}} \in F_{RF}$ and $W_{RF}=W_{RF,p_{best}} \in W_{RF}$.

Figure 9:
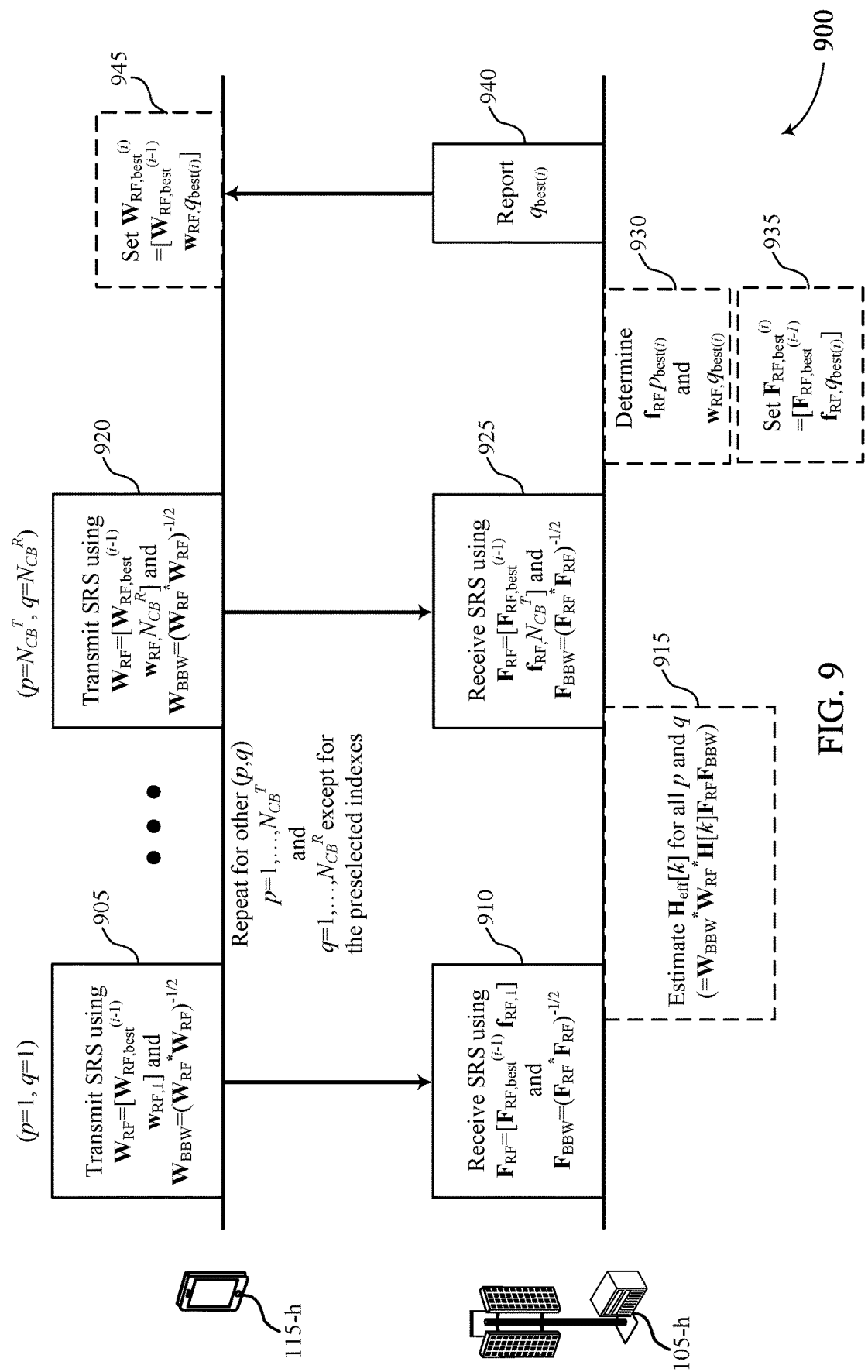
FIG. 9 illustrates an example of a process flow that supports iterative multi-beam selection with uplink-downlink beam training in accordance with aspects of the present disclosure.

FIG. 9 illustrates an example of a process flow 900 that supports iterative multi-beam selection with uplink-downlink beam training in accordance with aspects of the present disclosure. The process flow 900 may illustrate an iterative search for determining a transmit analog precoder ($F_{RF}$) and a receive analog combiner ($W_{RF}$) using an uplink reference signal. In some examples, the process flow 900 may implement aspects of the wireless communications systems 100 through 500, as described with reference to FIGS. 1 through 5. For example, the process flow 900 may be based on a configuration by a base station 105 or a UE 115, and implemented by the UE 115 for reduced power consumption, spectral efficiency, higher data rates and, in some examples, may promote high reliability and low latency for beamforming operations, among other benefits.

The process flow 900 may include a base station 105-h and a UE 115-h, which may be examples of base stations 105 and UEs 115 as described with reference to FIGS. 1 through 5. In the following description of the process flow 900, the operations between the base station 105-h and the UE 115-h may be transmitted in a different order than the example order shown, or the operations performed by the base station 105-h and the UE 115-h may be performed in different orders or at different times. Some operations may also be omitted from the process flow 900, and other operations may be added to the process flow 900.

At 905, the process flow 900 may commence with the UE 115-h may transmit an SRS using $W_{RF}=[W_{RF,best}^{(i-1)} \; w_{RF,1}]$ and $W_{BBW}=(W^*_{RF}W_{RF})^{-1/2}$. At 910, the base station 105-h receive the SRS using $F_{RF}=[F_{RF,best}^{(i-1)} \; f_{RF,1}]$ and $F_{BBW}=(F^*_{RF}F_{RF})^{-1/2}$. At 915, the base station 105-h may estimate $H_{eff}[k]$ for all p and q. In some examples, the base station 105-h may estimate $H_{eff}[k]$ to be $W^*_{BBW}W^*_{RF}H[K]F_{RF}F_{BBW}$ for all p and q. Thus, the base station 105-h may select a p-element from a matrix (codebook) $F_{RF}$, for example, p=1, and receive the SRS on a directional beam corresponding to p=1. Similarly, the UE 115-h may select a q-element from a matrix (codebook) $W_{RF}$, for example, q=1, and transmit the SRS on a directional beam corresponding to q=1.

In some examples, the base station 105-h and the UE 115-h may repeat the operations in 905, 910, and 915 for other combinations of (p, q), for example, p=1, . . . , $N_{CB}^T$ and q=1, . . . , $N_{CB}^R$ except for the preselected indexes. For example, at 920, the UE 115-h may transmit a SRS using $W_{RF}=[W_{RF,best}^{(i-1)} \; w_{RF,N_{CB}^R}]$ and $W_{BBW}=(W^*_{RF}W_{RF})^{-1/2}$. At 925, the base station 105-h may receive the SRS using $F_{RF}=[F_{RF,best}^{(i-1)} \; f_{RF,N_{CB}^T}]$ and $F_{BBW}=(F^*_{RF}F_{RF})^{-1/2}$, and estimate $H_{eff}[k]$ for $p=N_{CB}^T$ and $q=N_{CB}^R$. At 930, the base station 105-h may determine a $f_{RF,p_{best(i)}}$ and a $w_{RF,p_{best(i)}}$.

At 935, the base station 105-h may set $F_{RF,best}^{(i)}=[F_{RF,best}^{(i-1)} \; f_{RF,q_{best(i)}}]$. At 940, the base station 105-h may report the $q_{best(i)}$ to the UE 115-h. At 945, the UE 115-h may set $W_{RF,best}^{(i)}=[W_{RF,best}^{(i-1)} \; w_{RF,q_{best(i)}}]$. The base station 105-h and the UE 115-h may repeat the above operations for i=1, . . . , $N_{RF}$ (i.e., $N_{RF}$ iterations). Thus, the final results may be $$F_{RF} = [f_{RF,p_{best(1)}} \; \cdots \; f_{RF,p_{best(N_{RF})}}], \text{ where } f_{RF,p_{best(i)}} \in C_{TX\_CB},$$

$$\text{and } W_{RF} = [w_{RF,q_{best(1)}} \; \cdots \; w_{RF,q_{best(N_{RF})}}], \text{ where } w_{RF,q_{best(i)}} \in C_{RX\_CB}.$$

Figure 10:
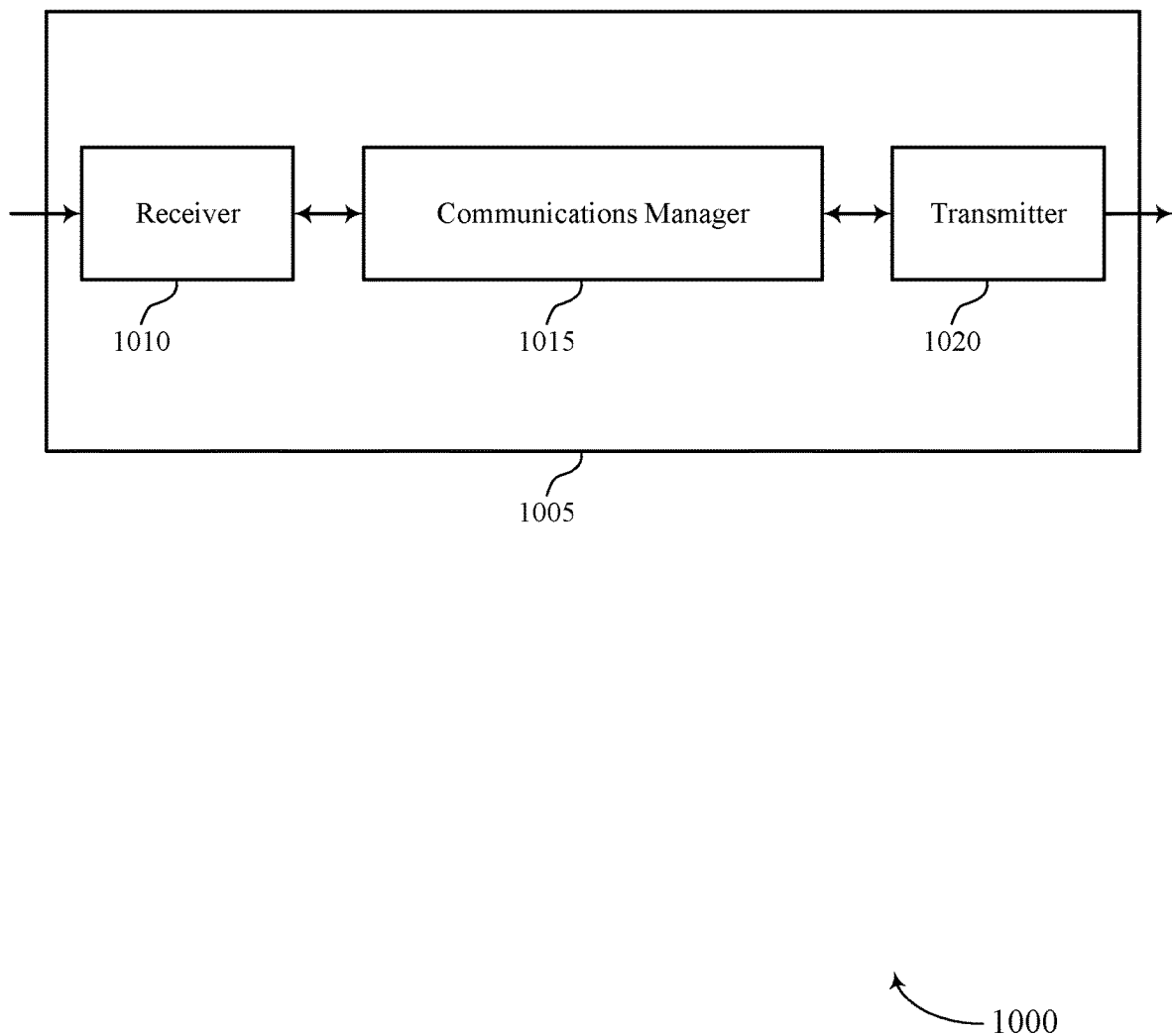
FIGS. 10 and 11 show block diagrams of devices that support iterative multi-beam selection with uplink-downlink beam training in accordance with aspects of the present disclosure.

FIG. 10 shows a block diagram 1000 of a device 1005 that supports iterative multi-beam selection with uplink-downlink beam training in accordance with aspects of the present disclosure. The device 1005 may be an example of aspects of a device as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to iterative multi-beam selection with uplink-downlink beam training, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, from a first device (e.g., the device 1005) to a second device, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles, receive, from the second device over the set of cycles, a set of reports, each report of the set of reports indicating a set of combinations of analog beamforming parameters selected for the analog beamforming parameters at the second device, where each combination of analog beamforming parameters of the set of combinations of analog beamforming parameters corresponds to different cycles of the set of cycles, set, for each radio frequency chain of a set of radio frequency chains associated with the first device (e.g., the device 1005), a corresponding combination of analog beamforming parameters of the set of combinations of analog beamforming parameters based on the receiving, and communicate with the second device via two or more beams based on the setting.

The communications manager 1015 may also measure, at a second device (e.g., the device 1005), a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles, select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device, and communicate with the first device via two or more beams based on the set of combinations of analog beamforming parameters. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
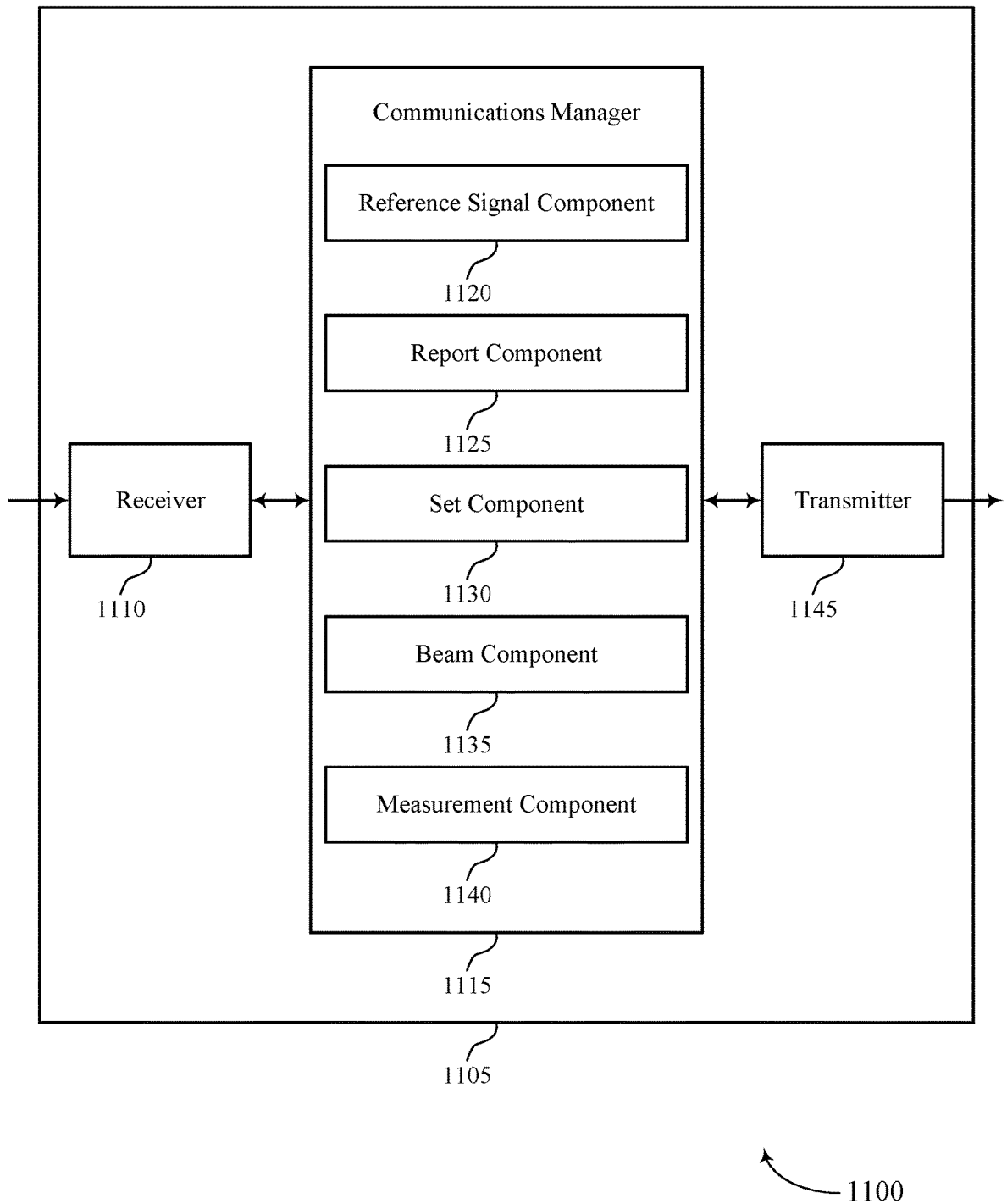

FIG. 11 shows a block diagram 1100 of a device 1105 that supports iterative multi-beam selection with uplink-downlink beam training in accordance with aspects of the present disclosure. The device 1105 may be an example of aspects of a device 1005 or a device 115 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to iterative multi-beam selection with uplink-downlink beam training, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reference signal component 1120, a report component 1125, a set component 1130, a beam component 1135, and a measurement component 1140. The communications manager 1115 may be an example of aspects of the communications manager 1310 described herein.

The reference signal component 1120 may transmit, from a first device (e.g., the device 1105) to a second device, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles. The report component 1125 may receive, from the second device over the set of cycles, a set of reports, each report of the set of reports indicating a set of combinations of analog beamforming parameters selected for the analog beamforming parameters at the second device, where each combination of analog beamforming parameters of the set of combinations of analog beamforming parameters corresponds to different cycles of the set of cycles. The set component 1130 may set, for each radio frequency chain of a set of radio frequency chains associated with the first device, a corresponding combination of analog beamforming parameters of the set of combinations of analog beamforming parameters based on the receiving. The beam component 1135 may communicate with the second device via two or more beams based on the setting.

The measurement component 1140 may measure, at a second device (e.g., the device 1105), a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles. The set component 1130 may select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device (e.g., the device 1105). The beam component 1135 may communicate with the first device via two or more beams based on the set of combinations of analog beamforming parameters.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
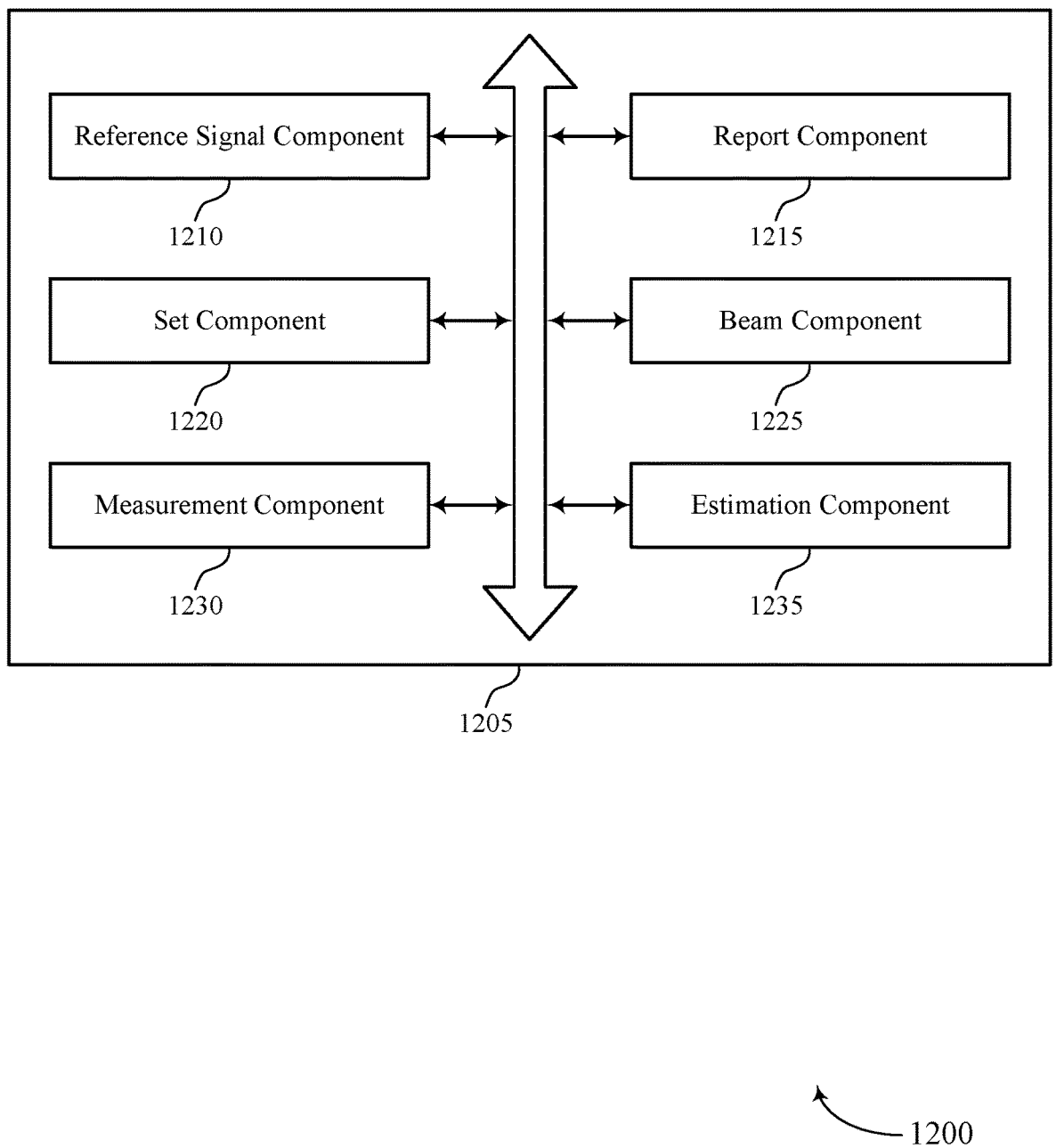
FIG. 12 shows a block diagram of a communications manager that supports iterative multi-beam selection with uplink-downlink beam training in accordance with aspects of the present disclosure.

FIG. 12 shows a block diagram 1200 of a communications manager 1205 that supports iterative multi-beam selection with uplink-downlink beam training in accordance with aspects of the present disclosure. The communications manager 1205 may be an example of aspects of a communications manager 1015, a communications manager 1115, or a communications manager 1310 described herein. The communications manager 1205 may include a reference signal component 1210, a report component 1215, a set component 1220, a beam component 1225, a measurement component 1230, and an estimation component 1235. Each of these modules may communicate, directly or indirectly, with one another (e.g., via one or more buses).

The reference signal component 1210 may transmit, from a first device to a second device, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles. In some cases, the set of cycles may be based on a number of radio frequency chains associated with the first device. In some cases, the first device may be a base station and the second device is a UE. In some cases, the set of reference signals may be downlink reference signals transmitted to the UE in a beam sweeping procedure. In some cases, the downlink reference signals include one or more of a CSI-RS or an SSB. In some cases, the first device is a UE and the second device may be a base station. In some cases, the set of reference signals may be uplink reference signals transmitted to the base station in a beam sweeping procedure. In some cases, the uplink reference signals include SRS. In some cases, the set of reference signals may include reference signals that are specific to transmissions from the first device to the second device, and where the first device determines set of combinations of analog beamforming parameters for use at the first device based on one or more different reference signals that are specific to transmissions from the second device to the first device. In some cases, the set of cycles is based on a number of radio frequency chains associated with the second device.

The report component 1215 may receive, from the second device over the set of cycles, a set of reports, each report of the set of reports indicating a set of combinations of analog beamforming parameters selected for the analog beamforming parameters at the second device, where each combination of analog beamforming parameters of the set of combinations of analog beamforming parameters corresponds to different cycles of the set of cycles.

In some examples, the report component 1215 may transmit, to the first device over the set of cycles, a set of reports, each report of the set of reports indicating the set of combinations of analog beamforming parameters selected for the analog beamforming parameters at the second device. In some cases, each report of the set of reports indicates a combination of analog beamforming parameters that provides a codebook index value for a codebook of beamforming parameters. In some cases, the codebook of beamforming parameters maps codebook index values to the different combinations of the one or more sets of transmit beamforming parameters and the one or more sets of receive beamforming parameters. In some cases, the set of combinations of analog beamforming parameters is associated with reference signal transmissions that have a highest mutual information (MI) value of the set of reference signals.

The set component 1220 may set, for each radio frequency chain of a set of radio frequency chains associated with the first device, a corresponding combination of analog beamforming parameters of the set of combinations of analog beamforming parameters based on the receiving. In some examples, the set component 1220 may select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device. In some examples, the set component 1220 may set, for each radio frequency chain of the set of radio frequency chains associated with the second device, a corresponding combination of analog beamforming parameters of the set of combinations of analog beamforming parameters based on the receiving. In some cases, the set of combinations of analog beamforming parameters is associated with reference signal transmissions that have a highest mutual information (MI) value of the set of reference signals.

The beam component 1225 may communicate with the second device via two or more beams based on the setting. In some examples, the beam component 1225 may communicate with the first device via two or more beams based on the set of combinations of analog beamforming parameters.

The measurement component 1230 may measure, at a second device, a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles. In some cases, the first device is a base station and the second device is a UE. In some cases, the set of reference signals are downlink reference signals transmitted to the UE in a beam sweeping procedure. In some cases, the downlink reference signals include one or more of a CSI-RS or an SSB. In some cases, the first device is a UE and the second device are a base station. In some cases, the set of reference signals are uplink reference signals transmitted to the base station in a beam sweeping procedure. In some cases, the uplink reference signals include SRSs. In some cases, the set of reference signals includes reference signals that are specific to transmissions from the first device to the second device, and where the second device determines the set of combinations of analog beamforming parameters for use at the second device based on one or more different reference signals that are specific to transmissions from the first device to the second device. The estimation component 1235 may estimate an effective channel between the second device and the first device for each of the different combinations of the one or more sets of transmit beamforming parameters and the one or more sets of receive beamforming parameters, and where the set of combinations of analog beamforming parameters is selected based on a magnitude of the effective channel estimates.

Figure 13:
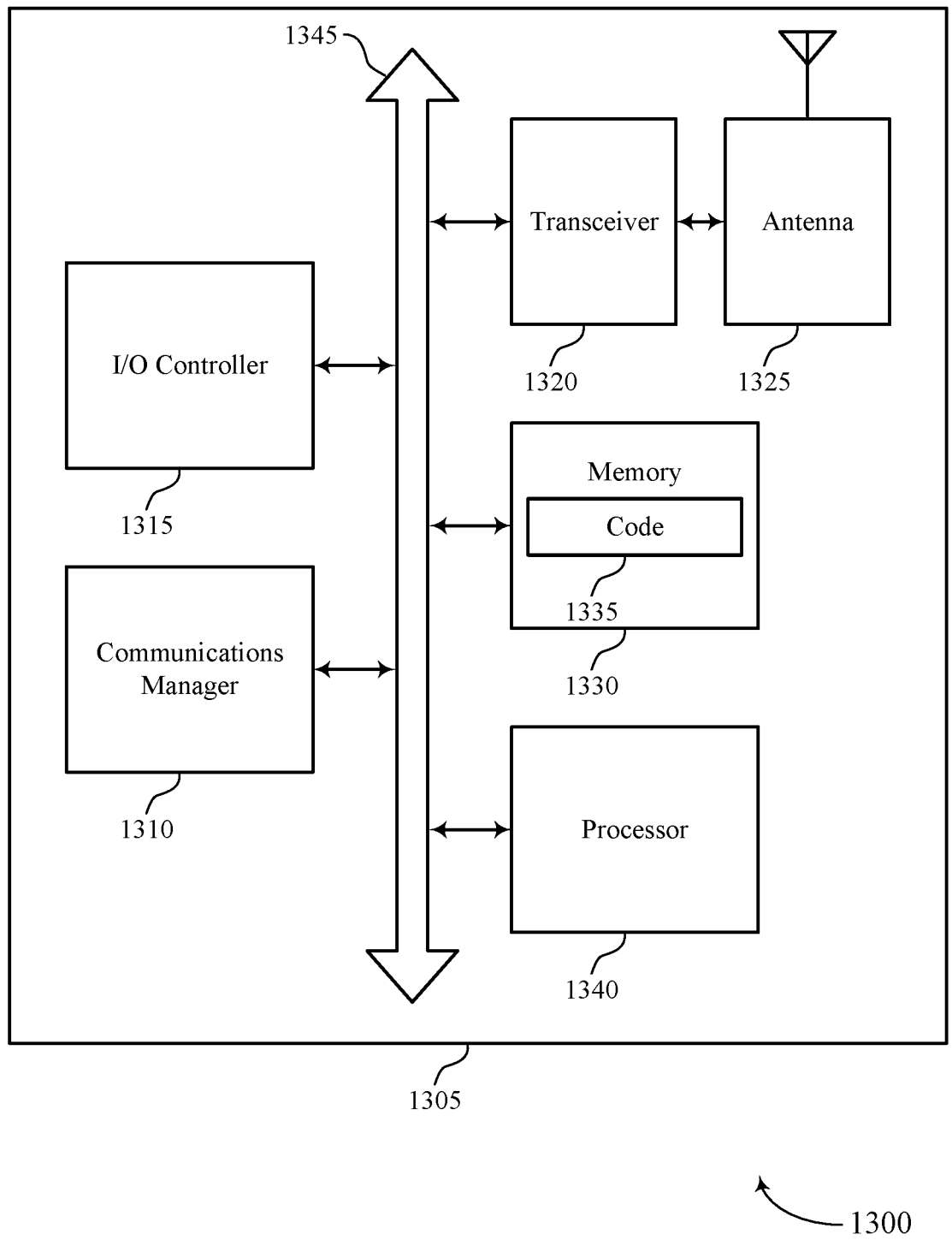
FIG. 13 shows a diagram of a system including a device that supports iterative multi-beam selection with uplink-downlink beam training in accordance with aspects of the present disclosure.

FIG. 13 shows a diagram of a system 1300 including a device 1305 that supports iterative multi-beam selection with uplink-downlink beam training in accordance with aspects of the present disclosure. The device 1305 may be an example of or include the components of device 1005, device 1105, or a device as described herein. The device 1305 may include components for bi-directional voice and data communications including components for transmitting and receiving communications, including a communications manager 1310, an I/O controller 1315, a transceiver 1320, an antenna 1325, memory 1330, a processor 1340, and a coding manager 1350. These components may be in electronic communication via one or more buses (e.g., bus 1345).

The communications manager 1310 may transmit, from a first device (e.g., the device 1305) to a second device, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles, receive, from the second device over the set of cycles, a set of reports, each report of the set of reports indicating a set of combinations of analog beamforming parameters selected for the analog beamforming parameters at the second device, where each combination of analog beamforming parameters of the set of combinations of analog beamforming parameters corresponds to different cycles of the set of cycles, set, for each radio frequency chain of a set of radio frequency chains associated with the first device (e.g., the device 1305), a corresponding combination of analog beamforming parameters of the set of combinations of analog beamforming parameters based on the receiving, and communicate with the second device via two or more beams based on the setting.

The communications manager 1310 may also measure, at a second device (e.g., the device 1305), a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles, select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device (e.g., the device 1305), and communicate with the first device via two or more beams based on the set of combinations of analog beamforming parameters.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases the device 1305 may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting iterative multi-beam selection with uplink-downlink beam training).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
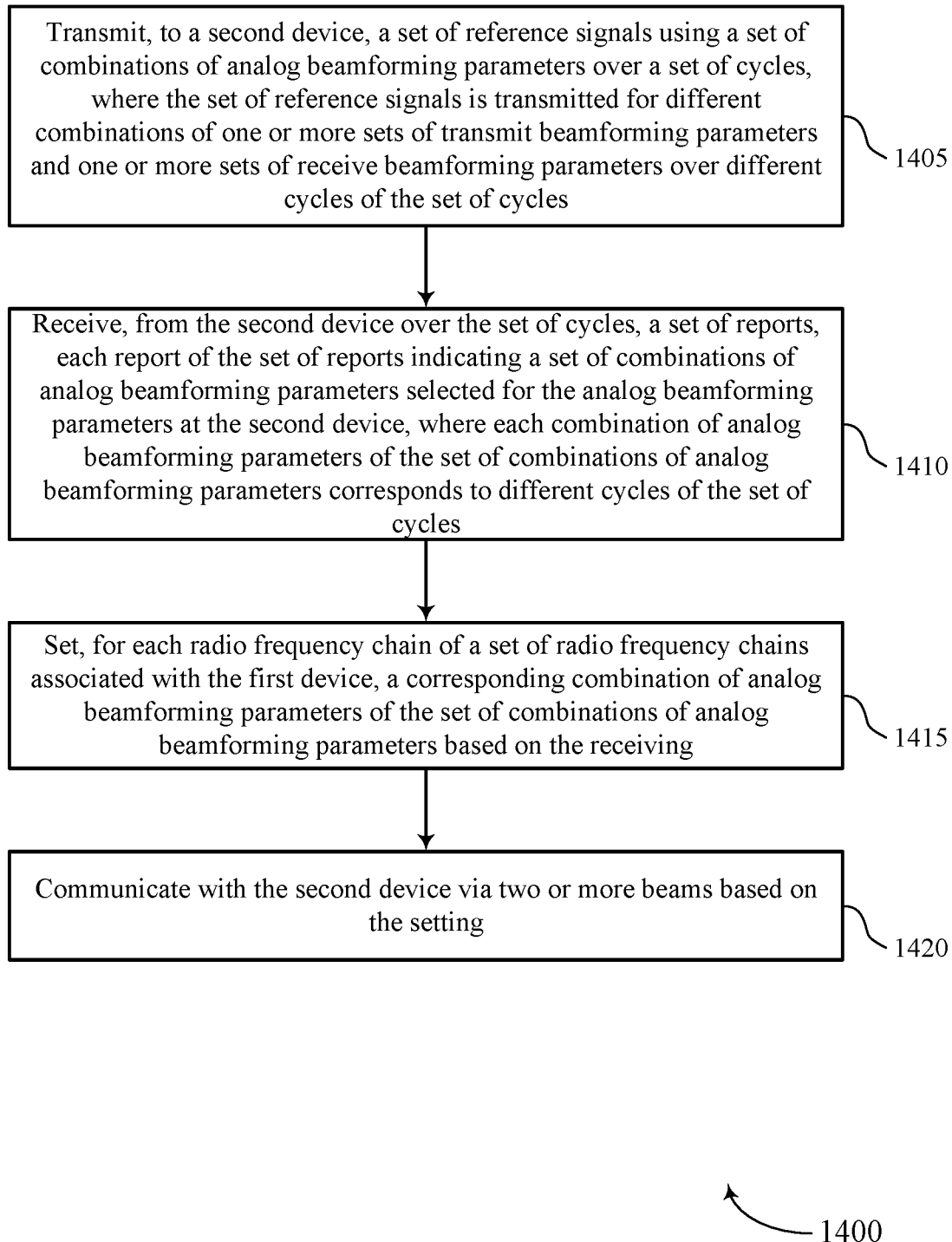
FIGS. 14 through 18 show flowcharts illustrating methods that support iterative multi-beam selection with uplink-downlink beam training in accordance with aspects of the present disclosure.

FIG. 14 shows a flowchart illustrating a method 1400 that supports iterative multi-beam selection with uplink-downlink beam training in accordance with aspects of the present disclosure. The operations of method 1400 may be implemented by a device or its components as described herein. For example, the operations of method 1400 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1405, the first device may transmit, to a second device, a set of reference signals using a set of combinations of analog beamforming parameters over a set of cycles, where the set of reference signals is transmitted for different combinations of one or more sets of transmit beamforming parameters and one or more sets of receive beamforming parameters over different cycles of the set of cycles. The operations of 1405 may be performed according to the methods described herein. In some examples, aspects of the operations of 1405 may be performed by a reference signal component as described with reference to FIGS. 10 through 13.

At 1410, the first device may receive, from the second device over the set of cycles, a set of reports, each report of the set of reports indicating a set of combinations of analog beamforming parameters selected for the analog beamforming parameters at the second device, where each combination of analog beamforming parameters of the set of combinations of analog beamforming parameters corresponds to different cycles of the set of cycles. The operations of 1410 may be performed according to the methods described herein. In some examples, aspects of the operations of 1410 may be performed by a report component as described with reference to FIGS. 10 through 13.

At 1415, the first device may set, for each radio frequency chain of a set of radio frequency chains associated with the first device, a corresponding combination of analog beamforming parameters of the set of combinations of analog beamforming parameters based on the receiving. The operations of 1415 may be performed according to the methods described herein. In some examples, aspects of the operations of 1415 may be performed by a set component as described with reference to FIGS. 10 through 13.

At 1420, the first device may communicate with the second device via two or more beams based on the setting. The operations of 1420 may be performed according to the methods described herein. In some examples, aspects of the operations of 1420 may be performed by a beam component as described with reference to FIGS. 10 through 13.

Figure 15:
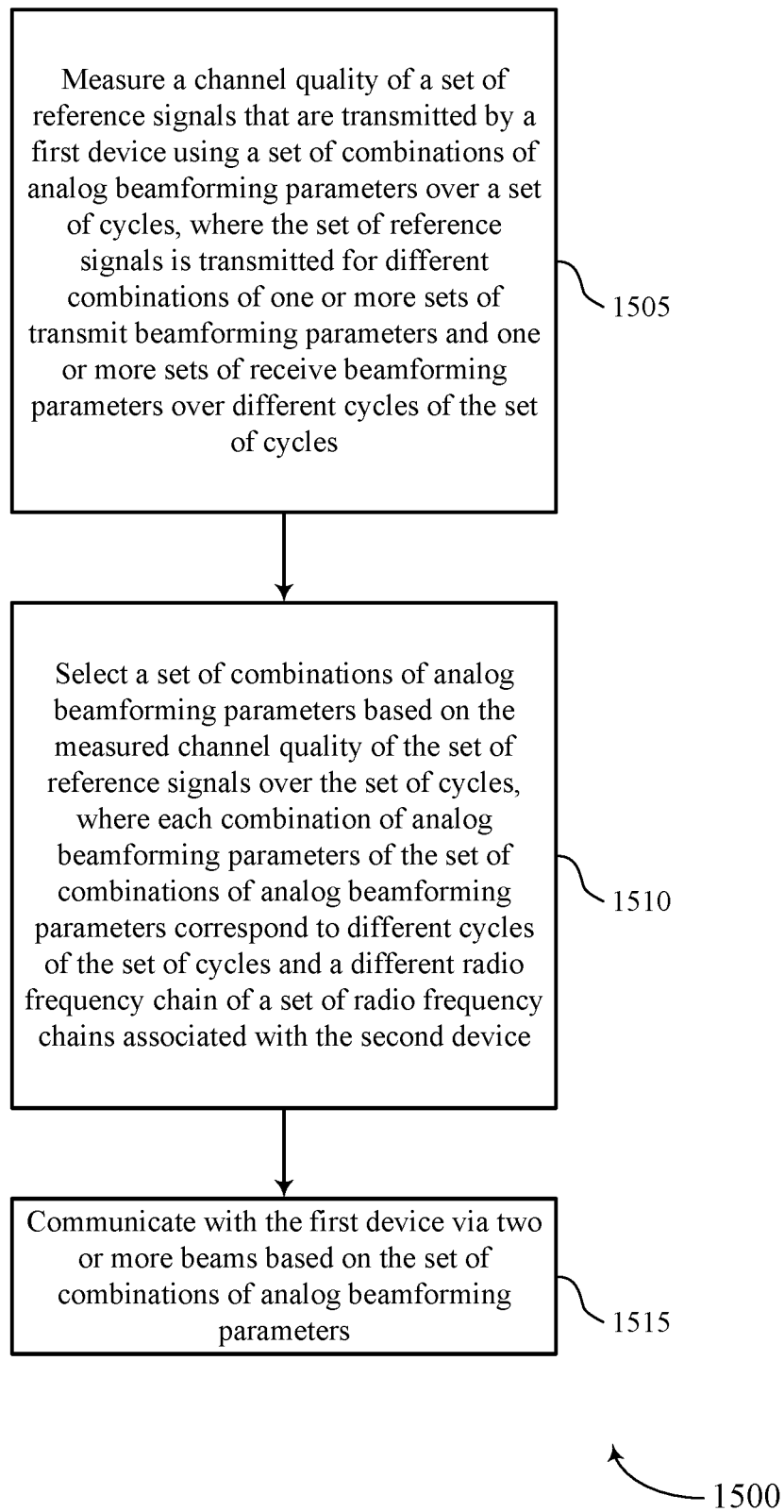

FIG. 15 shows a flowchart illustrating a method 1500 that supports iterative multi-beam selection with uplink-downlink beam training in accordance with aspects of the present disclosure. The operations of method 1500 may be implemented by a device or its components as described herein. For example, the operations of method 1500 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1505, the second device may measure a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles. The operations of 1505 may be performed according to the methods described herein. In some examples, aspects of the operations of 1505 may be performed by a measurement component as described with reference to FIGS. 10 through 13.

At 1510, the second device may select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device. The operations of 1510 may be performed according to the methods described herein. In some examples, aspects of the operations of 1510 may be performed by a set component as described with reference to FIGS. 10 through 13.

At 1515, the second device may communicate with the first device via two or more beams based on the set of combinations of analog beamforming parameters. The operations of 1515 may be performed according to the methods described herein. In some examples, aspects of the operations of 1515 may be performed by a beam component as described with reference to FIGS. 10 through 13.

Figure 16:
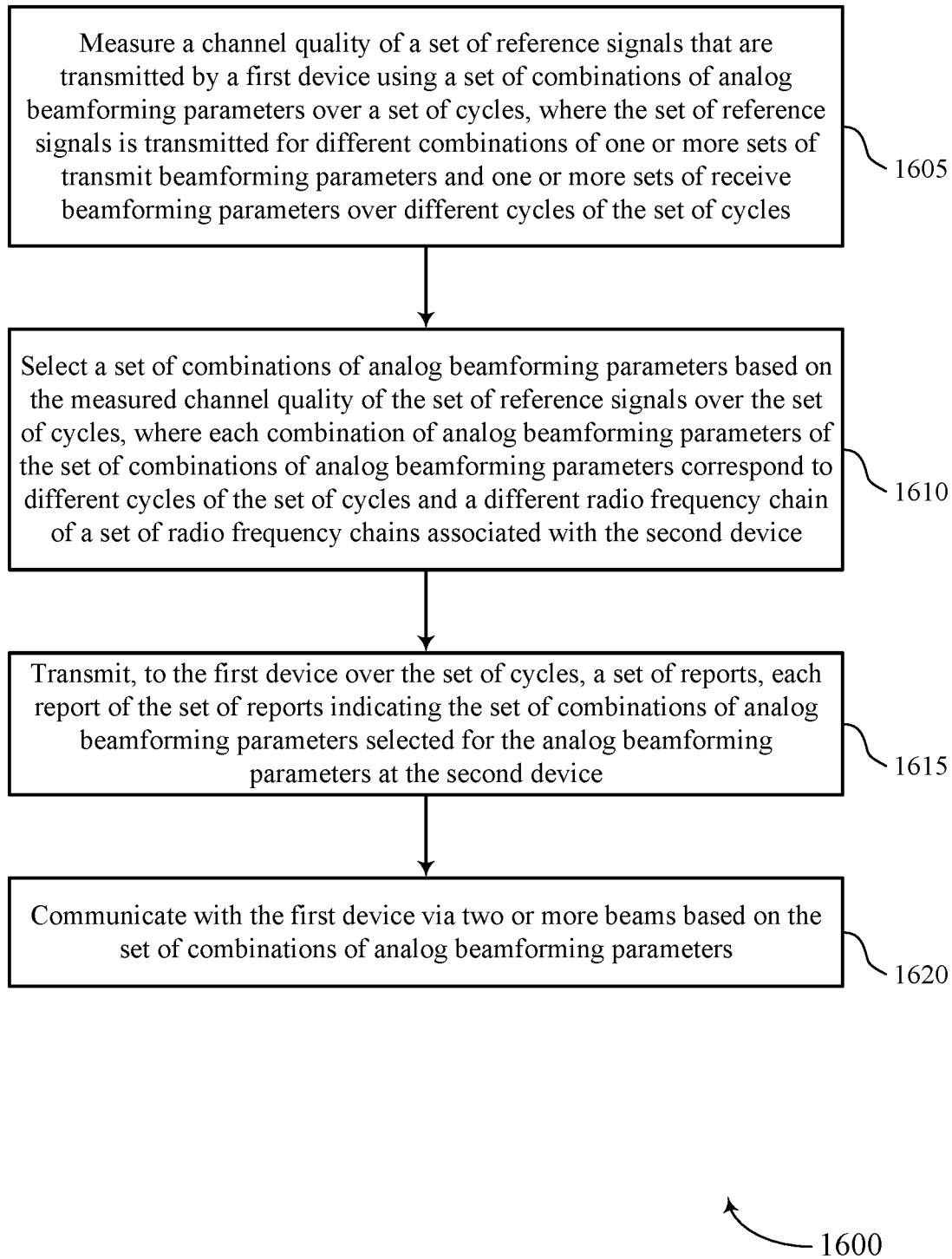

FIG. 16 shows a flowchart illustrating a method 1600 that supports iterative multi-beam selection with uplink-downlink beam training in accordance with aspects of the present disclosure. The operations of method 1600 may be implemented by a device or its components as described herein. For example, the operations of method 1600 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1605, the second device may measure a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles. The operations of 1605 may be performed according to the methods described herein. In some examples, aspects of the operations of 1605 may be performed by a measurement component as described with reference to FIGS. 10 through 13.

At 1610, the second device may select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device. The operations of 1610 may be performed according to the methods described herein. In some examples, aspects of the operations of 1610 may be performed by a set component as described with reference to FIGS. 10 through 13.

At 1615, the second device may transmit, to the first device over the set of cycles, a set of reports, each report of the set of reports indicating the set of combinations of analog beamforming parameters selected for the analog beamforming parameters at the second device. The operations of 1615 may be performed according to the methods described herein. In some examples, aspects of the operations of 1615 may be performed by a report component as described with reference to FIGS. 10 through 13.

At 1620, the second device may communicate with the first device via two or more beams based on the set of combinations of analog beamforming parameters. The operations of 1620 may be performed according to the methods described herein. In some examples, aspects of the operations of 1620 may be performed by a beam component as described with reference to FIGS. 10 through 13.

Figure 17:
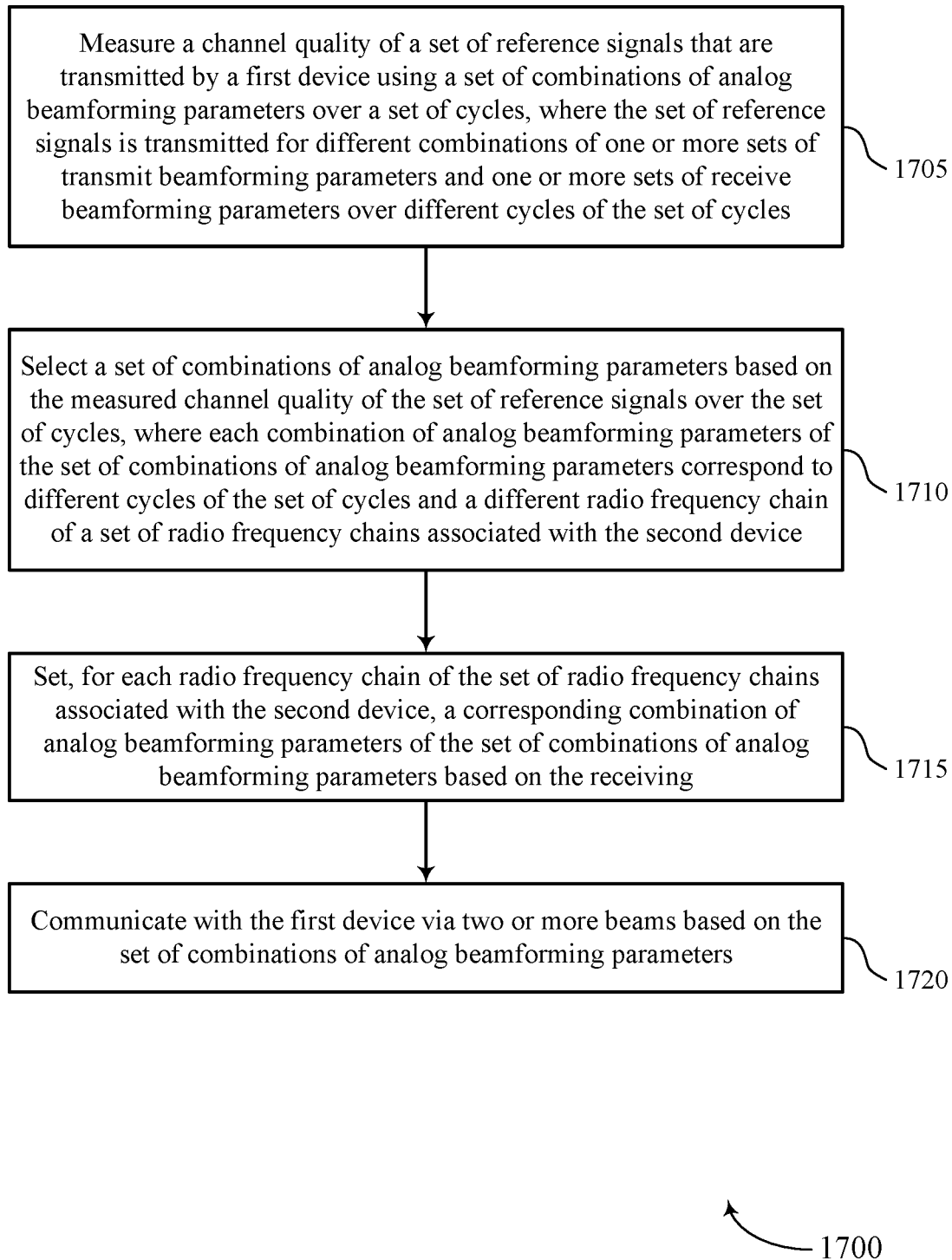

FIG. 17 shows a flowchart illustrating a method 1700 that supports iterative multi-beam selection with uplink-downlink beam training in accordance with aspects of the present disclosure. The operations of method 1700 may be implemented by a device or its components as described herein.

For example, the operations of method 1700 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1705, the second device may measure a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles. The operations of 1705 may be performed according to the methods described herein. In some examples, aspects of the operations of 1705 may be performed by a measurement component as described with reference to FIGS. 10 through 13.

At 1710, the second device may select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device. The operations of 1710 may be performed according to the methods described herein. In some examples, aspects of the operations of 1710 may be performed by a set component as described with reference to FIGS. 10 through 13.

At 1715, the second device may set, for each radio frequency chain of the set of radio frequency chains associated with the second device, a corresponding combination of analog beamforming parameters of the set of combinations of analog beamforming parameters based on the receiving. The operations of 1715 may be performed according to the methods described herein. In some examples, aspects of the operations of 1715 may be performed by a set component as described with reference to FIGS. 10 through 13.

At 1720, the second device may communicate with the first device via two or more beams based on the set of combinations of analog beamforming parameters. The operations of 1720 may be performed according to the methods described herein. In some examples, aspects of the operations of 1720 may be performed by a beam component as described with reference to FIGS. 10 through 13.

Figure 18:
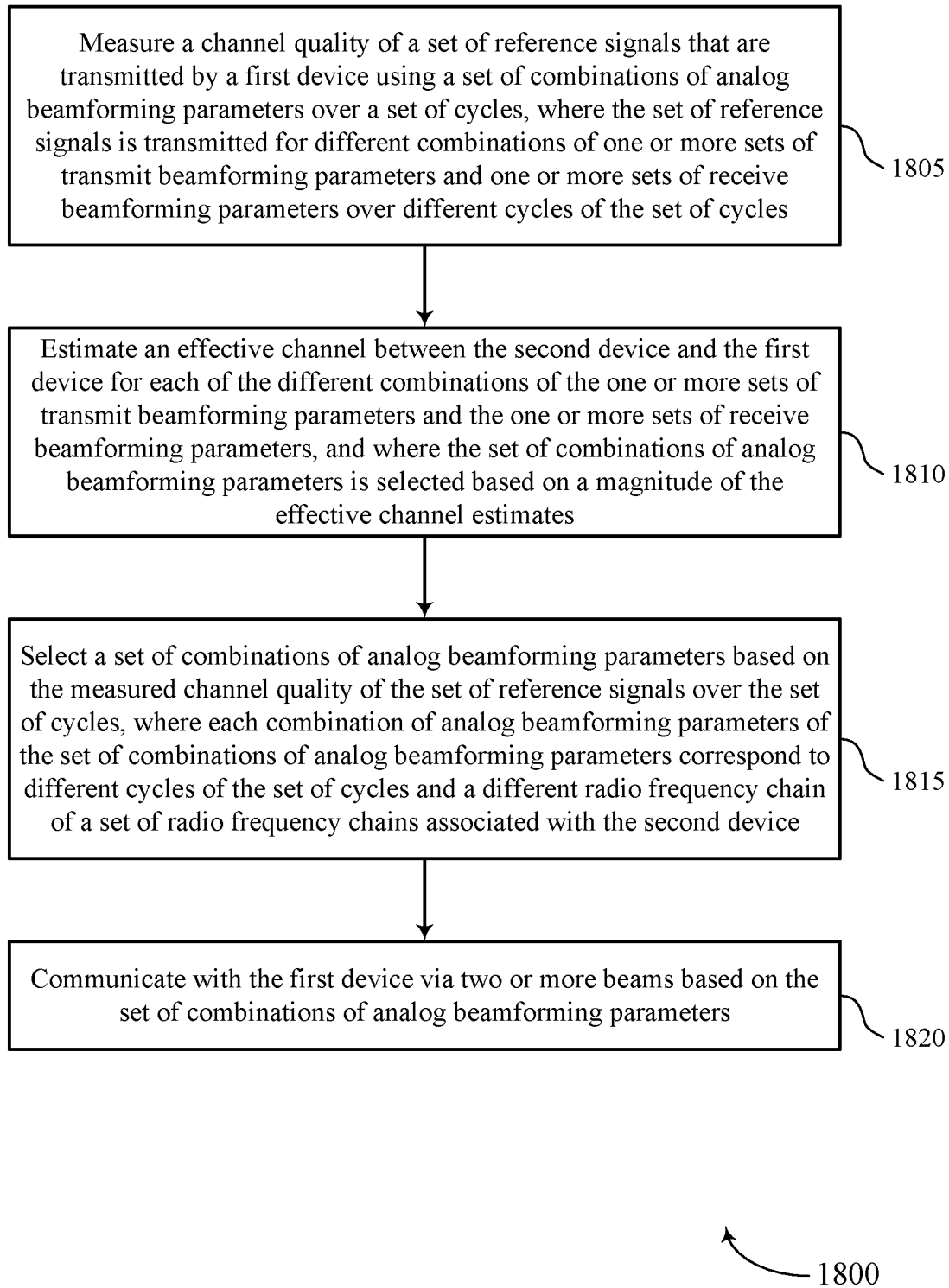

FIG. 18 shows a flowchart illustrating a method 1800 that supports iterative multi-beam selection with uplink-downlink beam training in accordance with aspects of the present disclosure. The operations of method 1800 may be implemented by a device or its components as described herein. For example, the operations of method 1800 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1805, the second device may measure a channel quality of a set of reference signals that are transmitted by a first device using a set of combinations of analog beamforming parameters over a set of cycles, where the set of reference signals is transmitted for different combinations of one or more sets of transmit beamforming parameters and one or more sets of receive beamforming parameters over different cycles of the set of cycles. The operations of 1805 may be performed according to the methods described herein. In some examples, aspects of the operations of 1805 may be performed by a measurement component as described with reference to FIGS. 10 through 13.

At 1810, the second device may estimate an effective channel between the second device and the first device for each of the different combinations of the one or more sets of transmit beamforming parameters and the one or more sets of receive beamforming parameters, and where the set of combinations of analog beamforming parameters is selected based on a magnitude of the effective channel estimates. The operations of 1810 may be performed according to the methods described herein. In some examples, aspects of the operations of 1810 may be performed by an estimation component as described with reference to FIGS. 10 through 13.

At 1815, the second device may select a set of combinations of analog beamforming parameters based on the measured channel quality of the set of reference signals over the set of cycles, where each combination of analog beamforming parameters of the set of combinations of analog beamforming parameters correspond to different cycles of the set of cycles and a different radio frequency chain of a set of radio frequency chains associated with the second device. The operations of 1815 may be performed according to the methods described herein. In some examples, aspects of the operations of 1815 may be performed by a set component as described with reference to FIGS. 10 through 13.

At 1820, the second device may communicate with the first device via two or more beams based on the set of combinations of analog beamforming parameters. The operations of 1820 may be performed according to the methods described herein. In some examples, aspects of the operations of 1820 may be performed by a beam component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising: a processor, memory coupled with the processor; and instructions stored in the memory and executable by the processor to cause the apparatus to:
   transmit, from a first device to a second device, a plurality of reference signals using a plurality of combinations of analog beamforming parameters over a plurality of cycles, wherein the plurality of reference signals is transmitted for different combinations of one or more sets of transmit beamforming parameters and one or more sets of receive beamforming parameters over different cycles of the plurality of cycles;
   receive, from the second device over the plurality of cycles, a plurality of reports, each report of the plurality of reports indicating a plurality of combinations of analog beamforming parameters selected for the analog beamforming parameters at the second device, wherein each combination of analog beamforming parameters of the plurality of combinations of analog beamforming parameters corresponds to different cycles of the plurality of cycles;
   set, for each radio frequency chain of a plurality of radio frequency chains associated with the first device, a corresponding combination of analog beamforming parameters of the plurality of combinations of analog beamforming parameters based at least in part on the plurality of reports; and
   communicate with the second device via two or more beams based at least in part on the set combination of analog beamforming parameters.

2. The apparatus of claim 1, wherein each report of the plurality of reports indicates a combination of analog beamforming parameters that provides a codebook index value for a codebook of beamforming parameters.

3. The apparatus of claim 2, wherein the codebook of beamforming parameters maps codebook index values to the different combinations of the one or more sets of transmit beamforming parameters and the one or more sets of receive beamforming parameters.

4. The apparatus of claim 1, wherein the plurality of cycles is based at least in part on a number of radio frequency chains associated with the first device.

5. The apparatus of claim 1, wherein the plurality of combinations of analog beamforming parameters is associated with reference signal transmissions that have a highest mutual information (MI) value of the plurality of reference signals.

6. The apparatus of claim 1, wherein the first device is a base station and the second device is a user equipment (UE), wherein the plurality of reference signals are downlink reference signals transmitted to the UE in a beam sweeping procedure, and wherein the downlink reference signals comprises one or more of a channel state information reference signal or a synchronization signal block.

7. The apparatus of claim 1, wherein the first device is a user equipment (UE) and the second device is a base station, wherein the plurality of reference signals are uplink reference signals transmitted to the base station in a beam sweeping procedure, and wherein the uplink reference signals comprises sounding reference signals.

8. The apparatus of claim 1, wherein the plurality of reference signals comprises reference signals that are specific to transmissions from the first device to the second device, and wherein the first device determines plurality of combinations of analog beamforming parameters for use at the first device based on one or more different reference signals that are specific to transmissions from the second device to the first device.

9. The apparatus of claim 1, wherein the plurality of cycles is based at least in part on a number of radio frequency chains associated with the second device.

10. An apparatus for wireless communication, comprising: a processor, memory coupled with the processor; and instructions stored in the memory and executable by the processor to cause the apparatus to:
measure, at a second device, a channel quality of a plurality of reference signals that are transmitted by a first device using a plurality of combinations of analog beamforming parameters over a plurality of cycles, wherein the plurality of reference signals is transmitted for different combinations of one or more sets of transmit beamforming parameters and one or more sets of receive beamforming parameters over different cycles of the plurality of cycles;
select a plurality of combinations of analog beamforming parameters based at least in part on the measured channel quality of the plurality of reference signals over the plurality of cycles, wherein each combination of analog beamforming parameters of the plurality of combinations of analog beamforming parameters correspond to different cycles of the plurality of cycles and a different radio frequency chain of a plurality of radio frequency chains associated with the second device; and
communicate with the first device via two or more beams based at least in part on the plurality of combinations of analog beamforming parameters.

11. The apparatus of claim 10, wherein the instructions are further executable to cause the apparatus to:
transmit, to the first device over the plurality of cycles, a plurality of reports, each report of the plurality of reports indicating the plurality of combinations of analog beamforming parameters selected for the analog beamforming parameters at the second device.

12. The apparatus of claim 11, wherein each report of the plurality of reports indicates a combination of analog beamforming parameters that provides a codebook index value for a codebook of beamforming parameters.

13. The apparatus of claim 12, wherein the codebook of beamforming parameters maps codebook index values to the different combinations of the one or more sets of transmit beamforming parameters and the one or more sets of receive beamforming parameters.

14. The apparatus of claim 10, wherein the instructions are further executable to cause the apparatus to:
set, for each radio frequency chain of the plurality of radio frequency chains associated with the second device, a corresponding combination of analog beamforming parameters of the plurality of combinations of analog beamforming parameters based at least in part on the receiving.

15. The apparatus of claim 10, wherein the instructions are further executable to cause the apparatus to:
estimate an effective channel between the second device and the first device for each of the different combinations of the one or more sets of transmit beamforming parameters and the one or more sets of receive beamforming parameters, and wherein the plurality of combinations of analog beamforming parameters is selected based on a magnitude of the estimated effective channel.

16. The apparatus of claim 10, wherein the plurality of combinations of analog beamforming parameters is associated with reference signal transmissions that have a highest mutual information (MI) value of the plurality of reference signals.

17. The apparatus of claim 10, wherein the first device is a base station and the second device is a user equipment (UE), wherein the plurality of reference signals are downlink reference signals transmitted to the UE in a beam sweeping procedure, and wherein the downlink reference signals comprises one or more of a channel state information reference signal or a synchronization signal block.

18. The apparatus of claim 10, wherein the first device is a user equipment (UE) and the second device is a base station, wherein the plurality of reference signals are uplink reference signals transmitted to the base station in a beam sweeping procedure, and wherein the uplink reference signals comprises sounding reference signals.

19. The apparatus of claim 10, wherein the plurality of reference signals comprises reference signals that are specific to transmissions from the first device to the second device, and wherein the second device determines the plurality of combinations of analog beamforming parameters for use at the second device based on one or more different reference signals that are specific to transmissions from the first device to the second device.

20. A method for wireless communication, comprising:
transmitting, from a first device to a second device, a plurality of reference signals using a plurality of combinations of analog beamforming parameters over a plurality of cycles, wherein the plurality of reference signals is transmitted for different combinations of one or more sets of transmit beamforming parameters and one or more sets of receive beamforming parameters over different cycles of the plurality of cycles;

receiving, from the second device over the plurality of cycles, a plurality of reports, each report of the plurality of reports indicating a plurality of combinations of analog beamforming parameters selected for the analog beamforming parameters at the second device, wherein each combination of analog beamforming parameters of the plurality of combinations of analog beamforming parameters corresponds to different cycles of the plurality of cycles;

setting, for each radio frequency chain of a plurality of radio frequency chains associated with the first device, a corresponding combination of analog beamforming parameters of the plurality of combinations of analog beamforming parameters based at least in part on the receiving; and communicating with the second device via two or more beams based at least in part on the setting.

21. The method of claim 20, wherein each report of the plurality of reports indicates a combination of analog beamforming parameters that provides a codebook index value for a codebook of beamforming parameters.

22. The method of claim 21, wherein the codebook of beamforming parameters maps codebook index values to the different combinations of the one or more sets of transmit beamforming parameters and the one or more sets of receive beamforming parameters.

23. The method of claim 20, wherein the plurality of cycles is based at least in part on a number of radio frequency chains associated with the first device, and wherein the plurality of combinations of analog beamforming parameters is associated with reference signal transmissions that have a highest mutual information (MI) value of the plurality of reference signals.

24. The method of claim 20, wherein the first device is a base station and the second device is a user equipment (UE), wherein the plurality of reference signals are downlink reference signals transmitted to the UE in a beam sweeping procedure, and wherein the downlink reference signals comprises one or more of a channel state information reference signal or a synchronization signal block.

25. The method of claim 20, wherein the first device is a user equipment (UE) and the second device is a base station, wherein the plurality of reference signals are uplink reference signals transmitted to the base station in a beam sweeping procedure, and wherein the uplink reference signals comprises sounding reference signals.

26. A method for wireless communication, comprising:

measuring, at a second device, a channel quality of a plurality of reference signals that are transmitted by a first device using a plurality of combinations of analog beamforming parameters over a plurality of cycles, wherein the plurality of reference signals is transmitted for different combinations of one or more sets of transmit beamforming parameters and one or more sets of receive beamforming parameters over different cycles of the plurality of cycles;

selecting a plurality of combinations of analog beamforming parameters based at least in part on the measured channel quality of the plurality of reference signals over the plurality of cycles, wherein each combination of analog beamforming parameters of the plurality of combinations of analog beamforming parameters correspond to different cycles of the plurality of cycles and a different radio frequency chain of a plurality of radio frequency chains associated with the second device; and communicating with the first device via two or more beams based at least in part on the plurality of combinations of analog beamforming parameters.

27. The method of claim 26, further comprising:

transmitting, to the first device over the plurality of cycles, a plurality of reports, each report of the plurality of reports indicating the plurality of combinations of analog beamforming parameters selected for the analog beamforming parameters at the second device.

28. The method of claim 27, wherein each report of the plurality of reports indicates a combination of analog beamforming parameters that provides a codebook index value for a codebook of beamforming parameters, and wherein the codebook of beamforming parameters maps codebook index values to the different combinations of the one or more sets of transmit beamforming parameters and the one or more sets of receive beamforming parameters.

29. The method of claim 26, further comprising:

setting, for each radio frequency chain of the plurality of radio frequency chains associated with the second device, a corresponding combination of analog beamforming parameters of the plurality of combinations of analog beamforming parameters based at least in part on the receiving.

30. The method of claim 26, further comprising:

estimating an effective channel between the second device and the first device for each of the different combinations of the one or more sets of transmit beamforming parameters and the one or more sets of receive beamforming parameters, and wherein the plurality of combinations of analog beamforming parameters is selected based on a magnitude of the estimated effective channel.

* * * * *